(12) United States Patent
Koshizuka et al.

(10) Patent No.: US 6,888,571 B1
(45) Date of Patent: May 3, 2005

(54) PHOTOSENSOR SYSTEM AND DRIVE CONTROL METHOD THEREOF

(75) Inventors: Yasuo Koshizuka, Fussa (JP); Makoto Sasaki, Hachioji (JP); Yoshiaki Nakamura, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 956 days.

(21) Appl. No.: 09/639,041

(22) Filed: Aug. 15, 2000

(30) Foreign Application Priority Data

Sep. 27, 1999 (JP) .......................................... 11-271882
Dec. 27, 1999 (JP) .......................................... 11-370533

(51) Int. Cl.[7] .............................................. H04N 5/335
(52) U.S. Cl. .................................. 348/302; 348/222.1
(58) Field of Search ................................ 348/302, 312, 348/313, 294, 311

(56) References Cited

U.S. PATENT DOCUMENTS

| | | | |
|---|---|---|---|
| 4,603,355 A | | 7/1986 | Yamada et al. |
| 5,162,644 A | * | 11/1992 | Nagata et al. ............ 250/208.1 |
| 5,461,419 A | | 10/1995 | Yamada |
| 5,583,570 A | | 12/1996 | Yamada |

FOREIGN PATENT DOCUMENTS

JP 58031669 A * 2/1983 ............ H04N/5/30

OTHER PUBLICATIONS

Official Action mailed Sep. 11, 2001 in counterpart Eurasian Patent Application No. 200100596/26, and English translation.

* cited by examiner

*Primary Examiner*—Tuan Ho
*Assistant Examiner*—Yogesh Aggarwal
(74) *Attorney, Agent, or Firm*—Frishauf, Holtz, Goodman & Chick, P.C.

(57) ABSTRACT

A photosensor system including a photosensor array having a plurality of photosensors arranged two-dimensionally comprises a driver circuit and a readout circuit for applying signal voltages to each photosensor, and also a control circuit having a function of controlling the voltages applied to each photosensor and adjusting the sensitivity of each photosensor. During an image reading operation and a reading operation for setting the sensitivity of each photosensor, a correction signal is generated, which has an effective voltage that can adjust an effective voltage, applied to each gate electrode of each photosensor, to 0 V, or to a value that minimizes degradation of the characteristics of each photosensor. This correction signal is applied to each gate electrode.

24 Claims, 18 Drawing Sheets

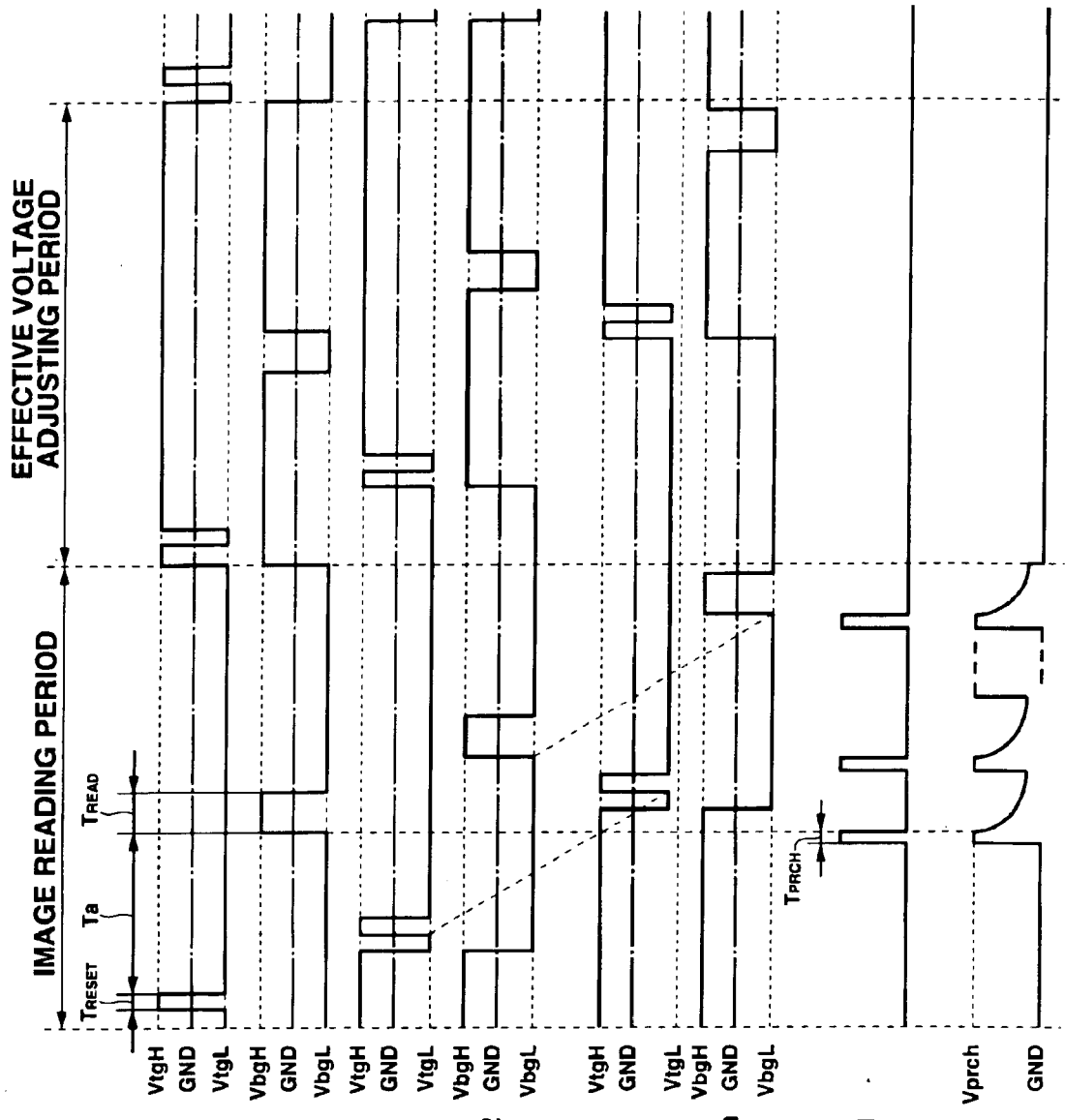

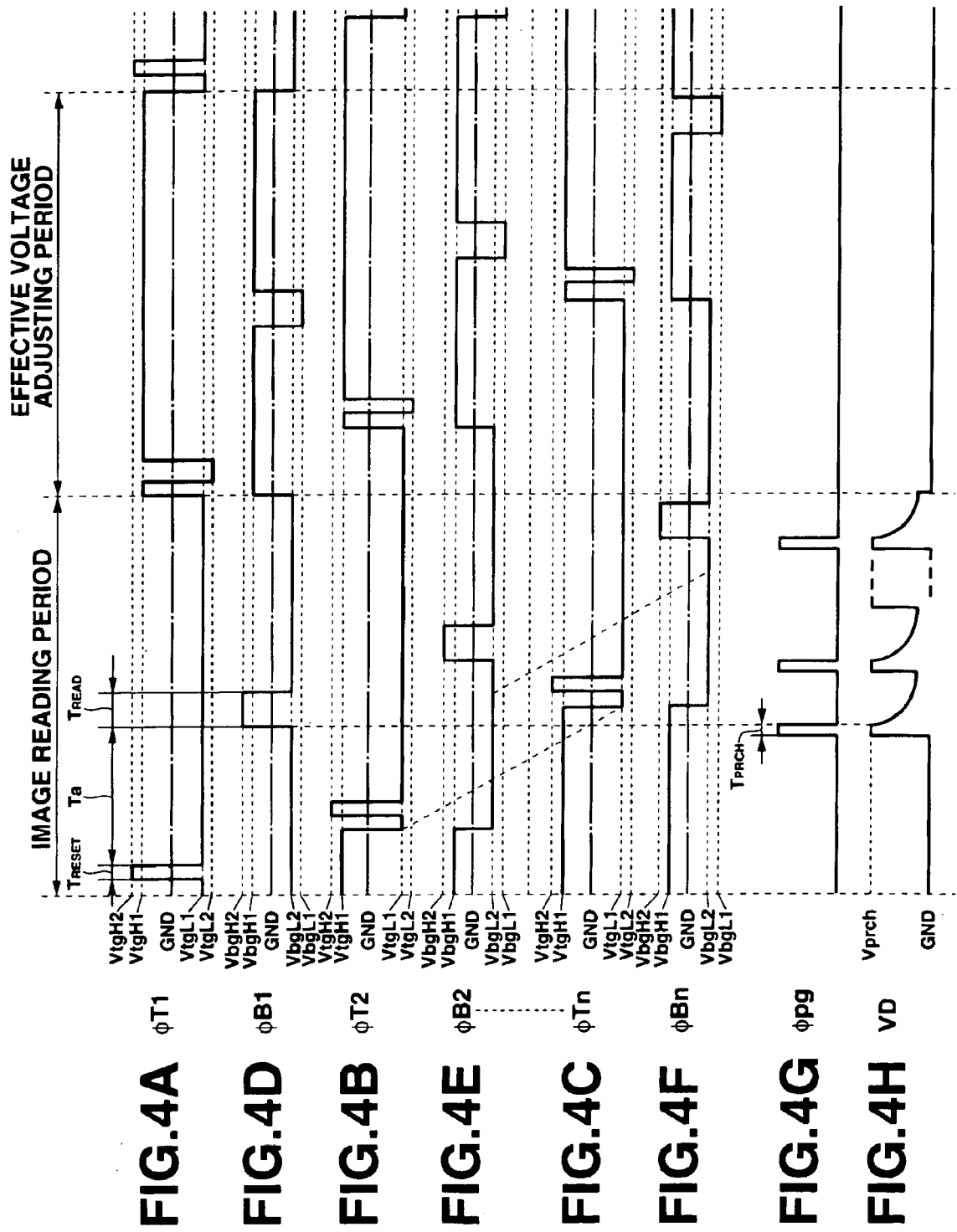

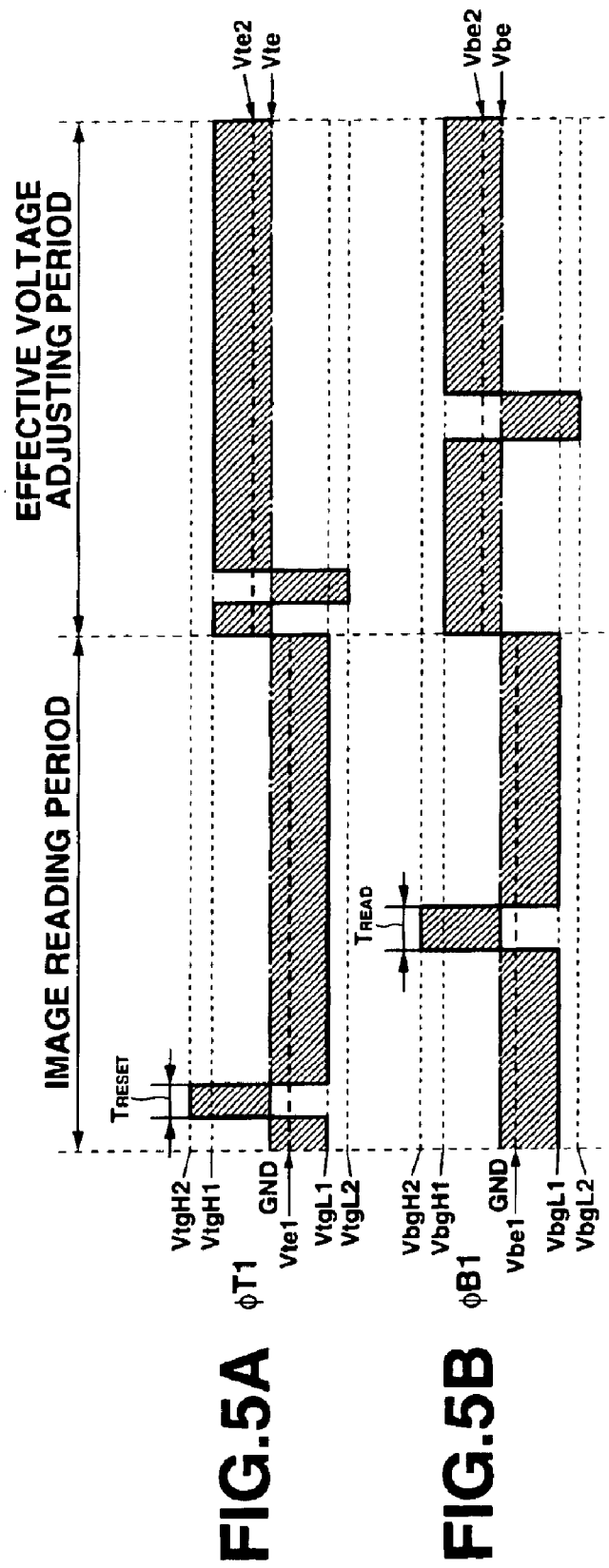

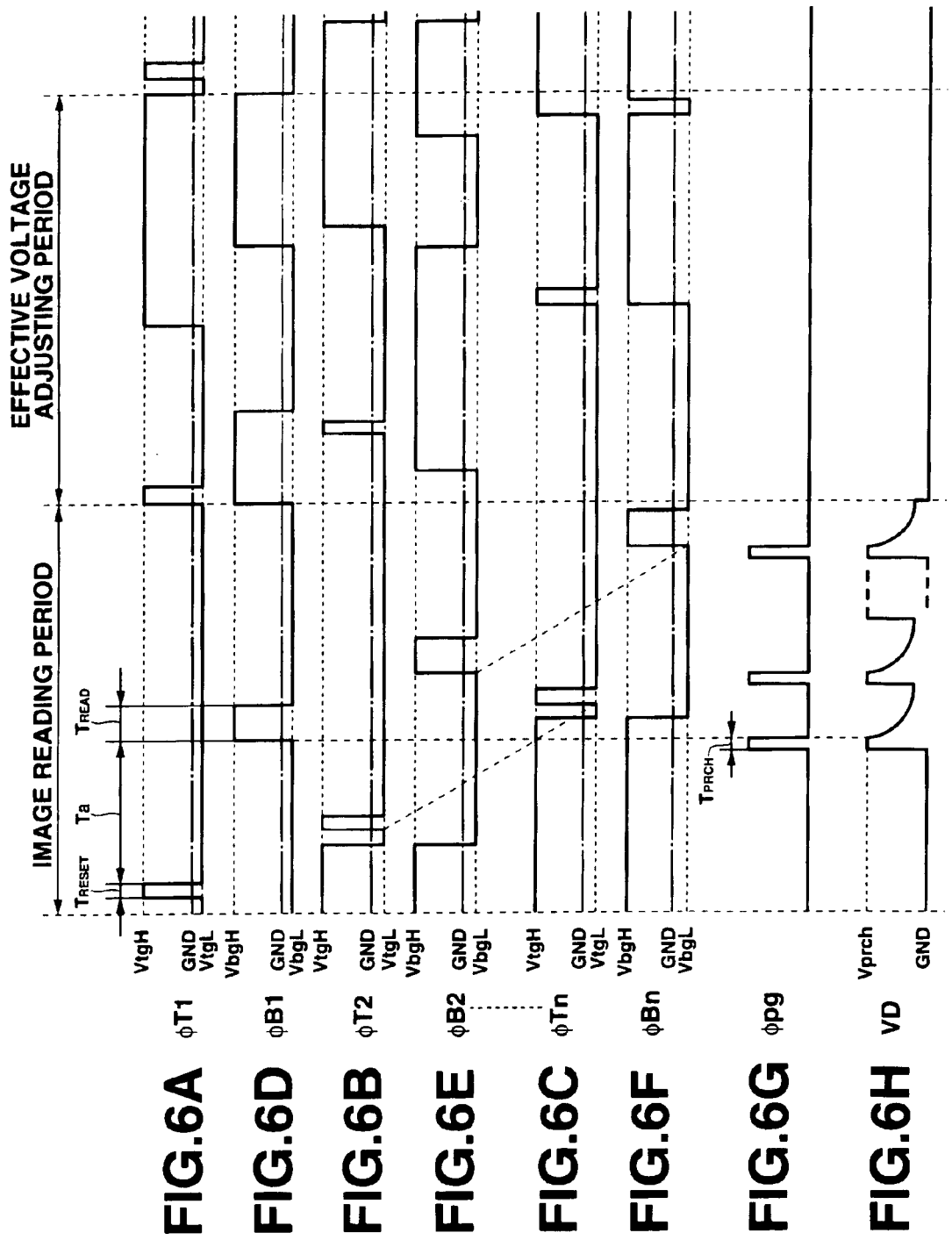

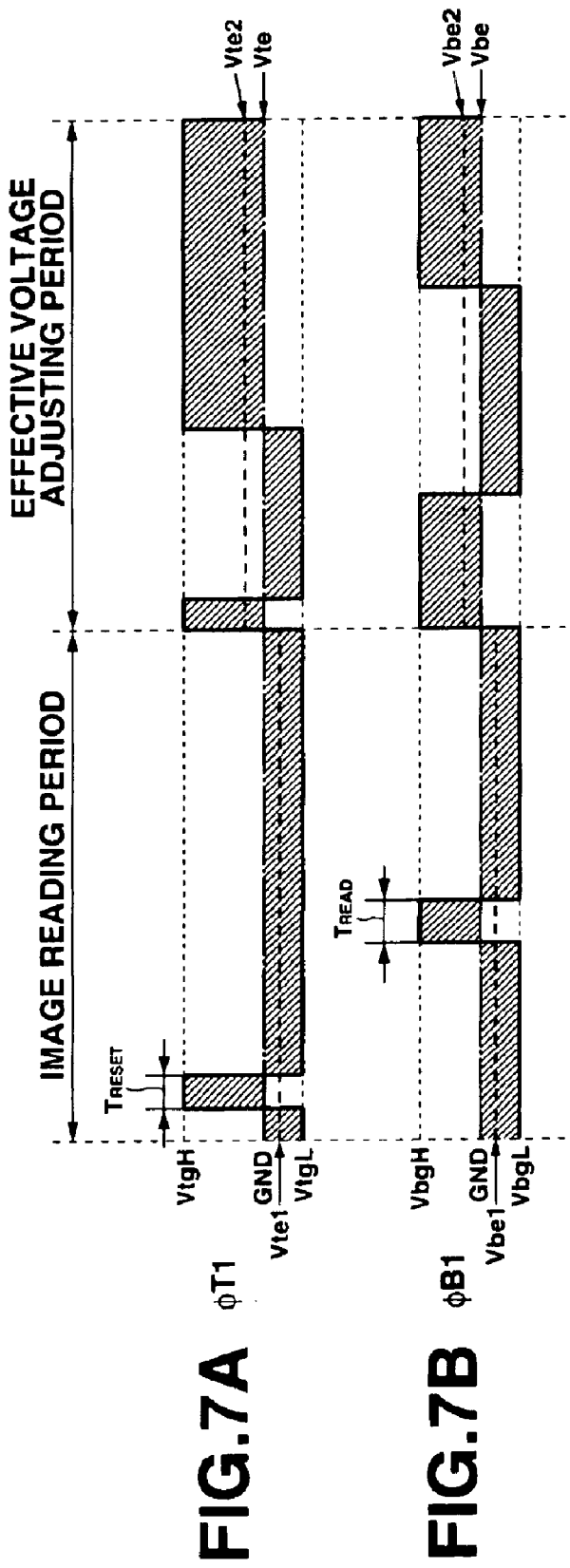

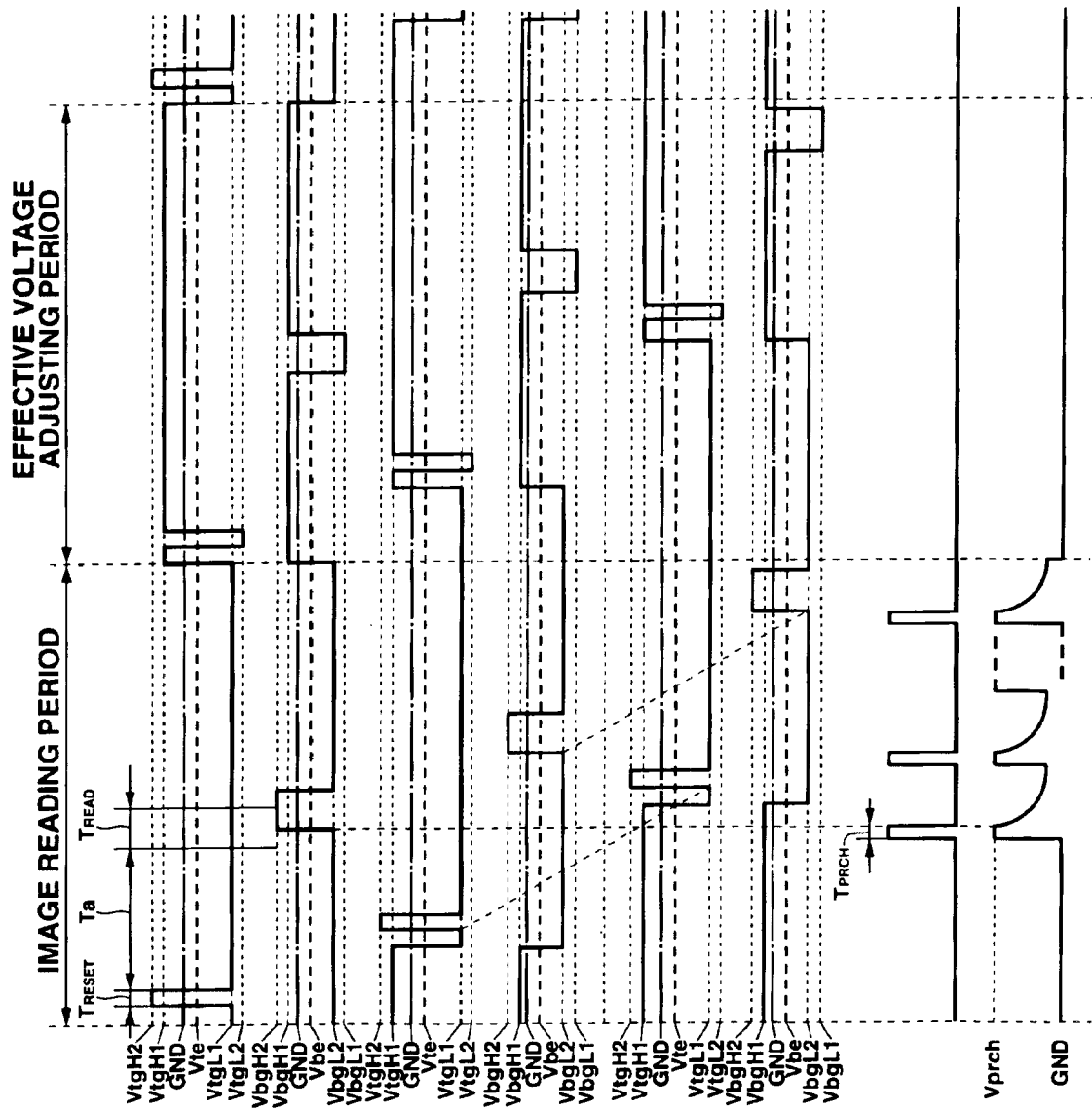

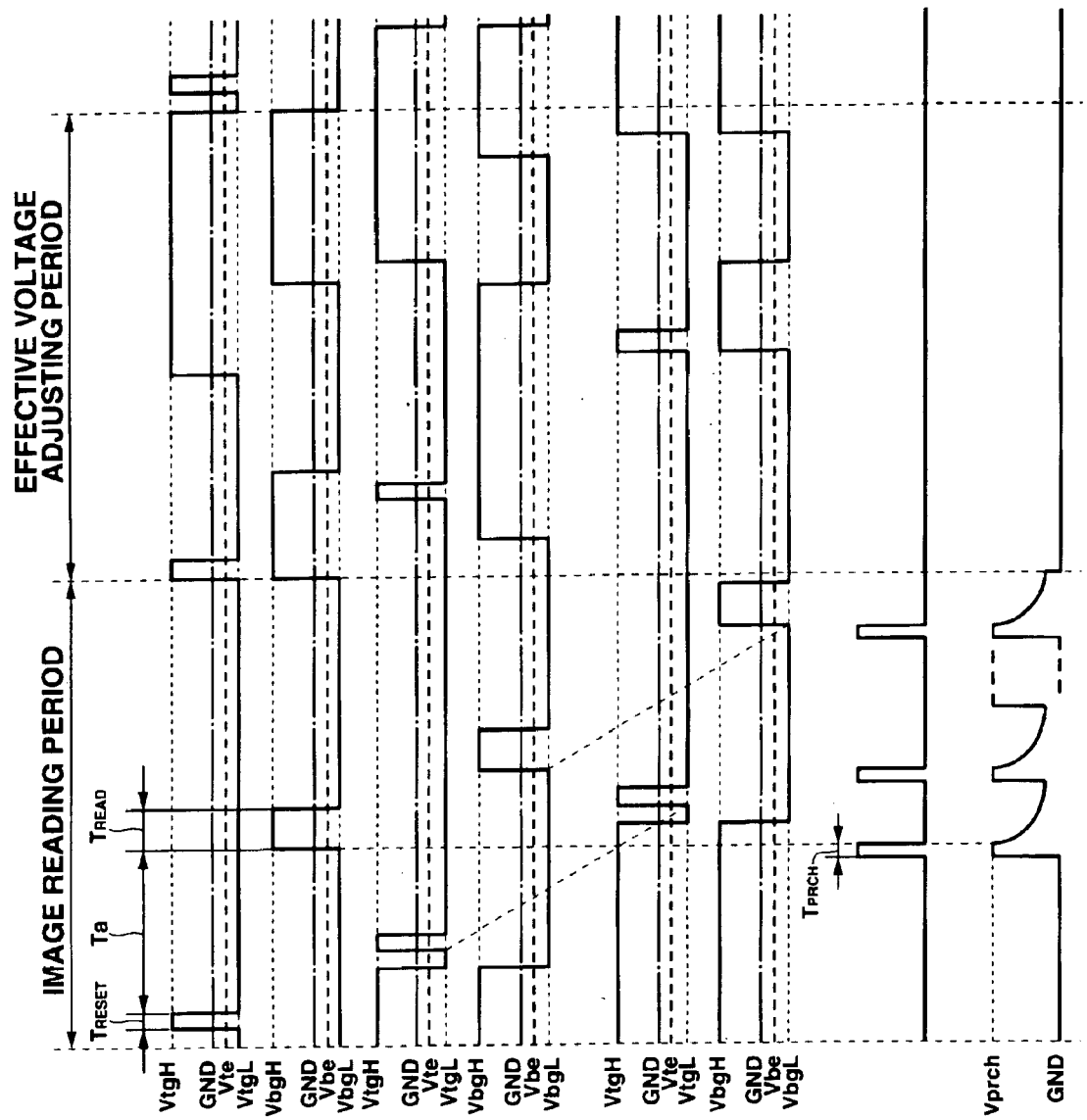

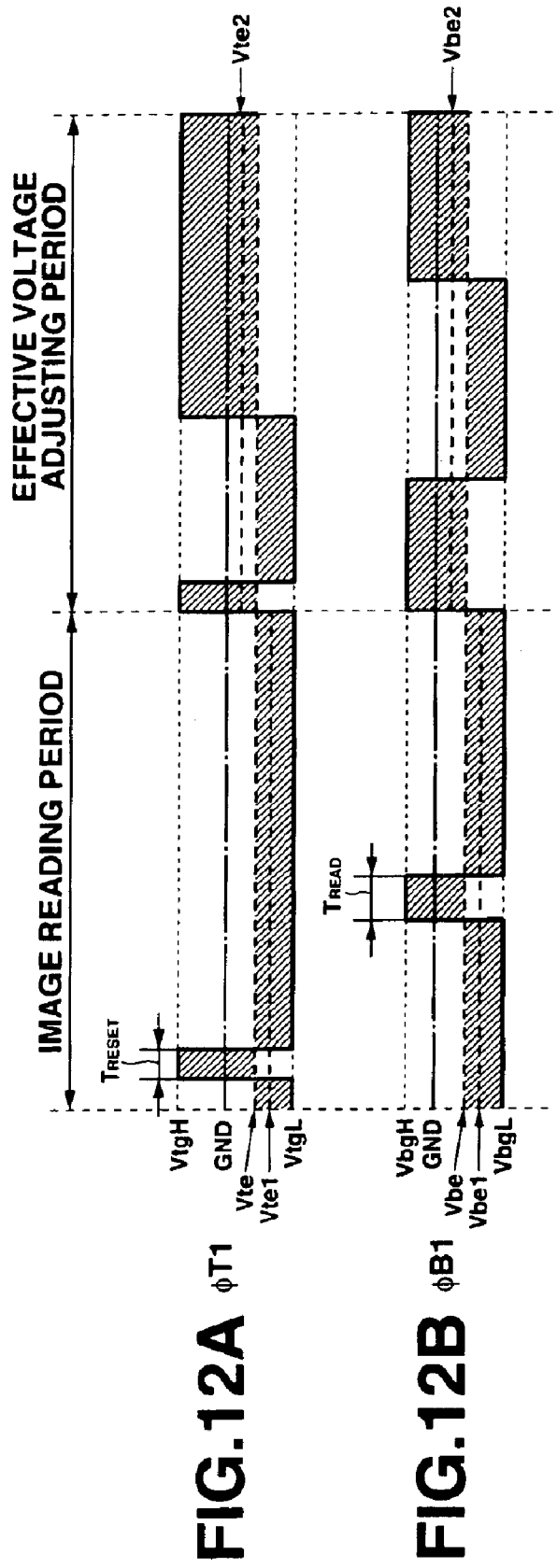

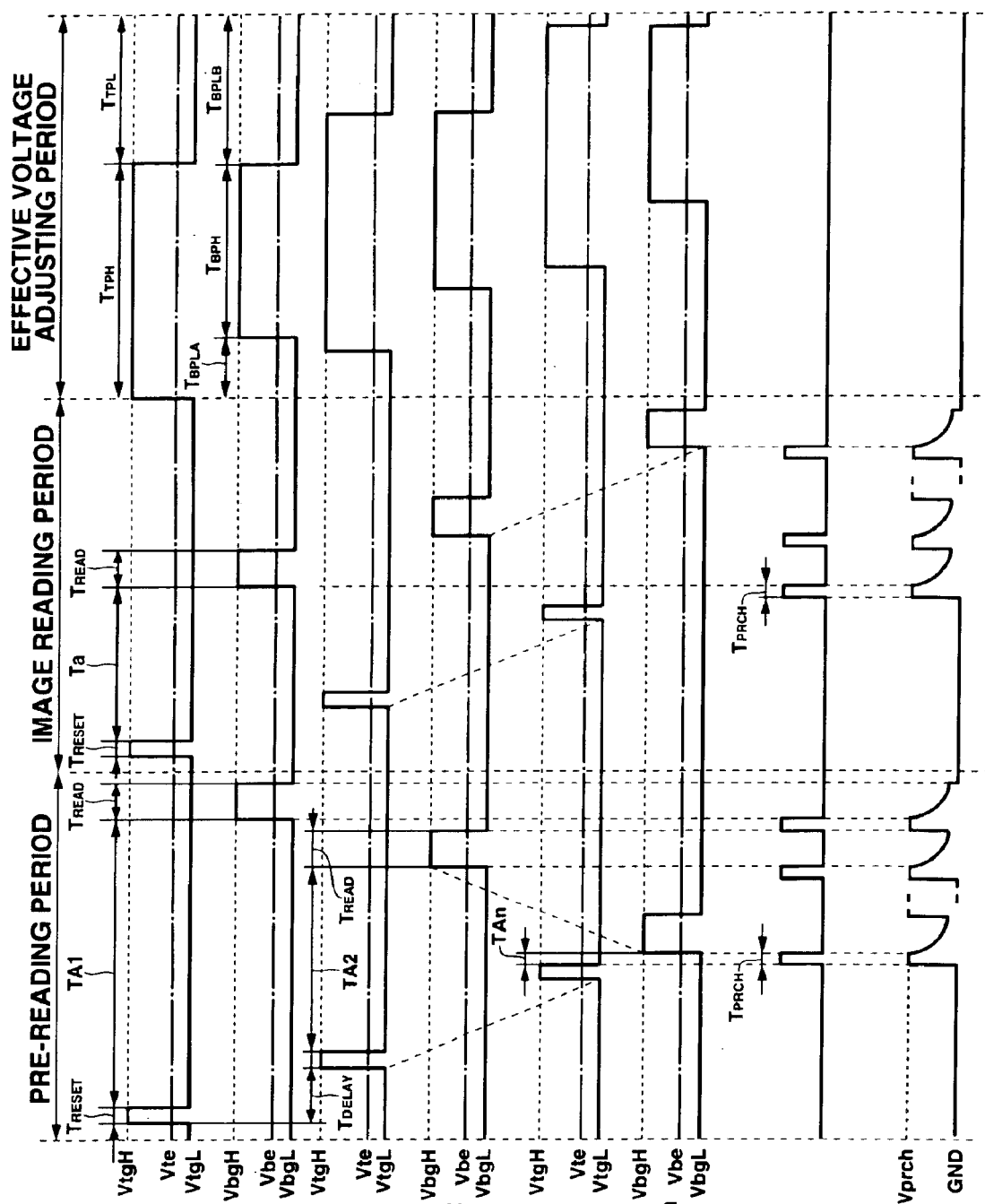

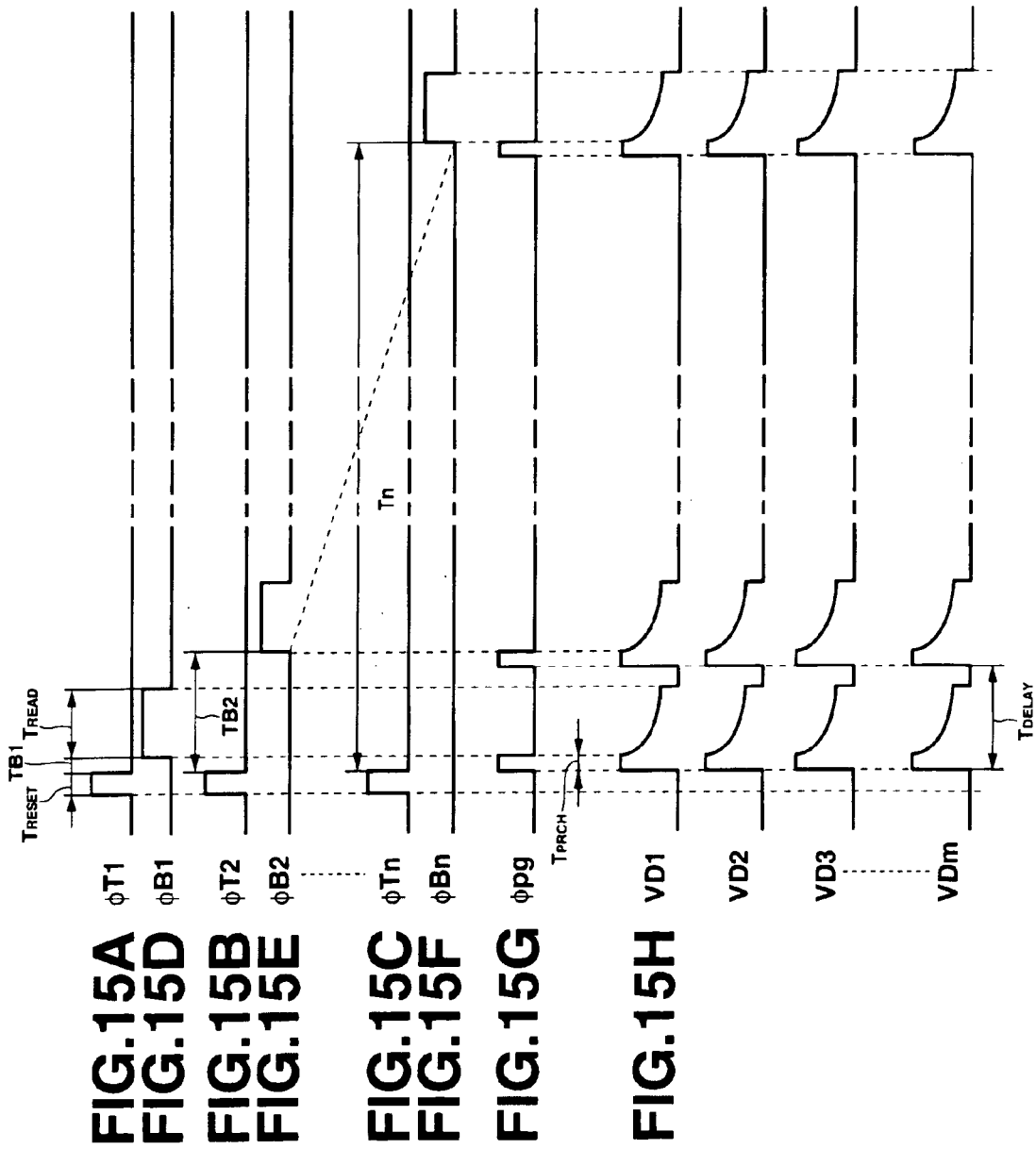

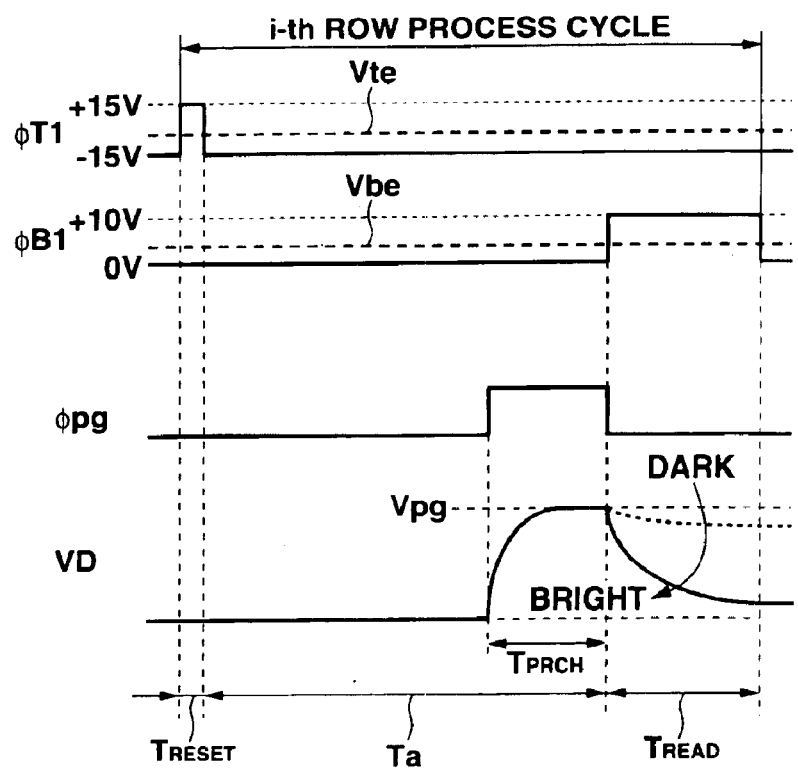

PHOTOSENSOR SYSTEM AND DRIVE CONTROL METHOD THEREOF

CROSS-REFERENCE TO RELATED APPLICATIONS

This application is based upon and claims the benefit of priority from the prior Japanese Patent Applications No. 11-271882, filed Sep. 27, 1999; and No. 11-370533, filed Dec. 27, 1999, the entire contents of which are incorporated herein by reference.

BACKGROUND OF THE INVENTION

This invention relates to a photosensor system having a two-dimensionally arranged photosensor array, and a method for drive-controlling the system.

Imaging apparatuses such as electronic still cameras, video cameras, etc. have come to be very widely used. These imaging apparatuses employ a solid-state imaging device, such as a CCD (Charge Coupled Device), which serves as a photoelectric converting device for converting an image of a to-be-photographed subject into an image signal. As well known, the CCD has a structure in which photosensors (light receiving elements) such as photodiodes, or thin film transistors (TFT: Thin Film Transistor) are arranged in a matrix, and the amount of pairs of electrons and positive holes (the amount of charge) generated corresponding to the amount of light entering the light receiving section of each sensor is detected by a horizontal scanning circuit and a vertical scanning circuit to thereby detect the luminance of radiation.

In a photosensor system using such a CCD, it is usually necessary to respectively provide scanned photosensors with selective transistors for causing the scanned photosensor to assume a selected state. In place of the combination of the photosensor and the selective transistor, a photosensor (hereinafter referred to as a "double-gate photosensor") is now being developed, which is formed of a thin film transistor having a so-called double-gate structure and has both a photosensing function and a selecting function.

FIG. 16A is a sectional view illustrating the structure of such a double-gate photosensor 10. The double-gate photosensor 10 comprises a semiconductor thin film 11 formed of amorphous silicon, $n^+$-silicon layers 17 and 18, a source electrode 12 and a drain electrode 13 formed on the $n^+$-silicon layers 17 and 18, respectively, a top gate electrode 21 formed above the semiconductor thin film 11 with a block insulating film 14 and an upper gate insulating film 15 interposed therebetween, a protective insulating film 20 provided on the top gate electrode 21, and a bottom gate electrode 22 provided below the semiconductor thin film 11 with a lower gate insulating film 16 interposed therebetween. The double-gate photosensor 10 is provided on a transparent insulating substrate 19 formed of, for example, glass.

In other words, the double-gate photosensor 10 includes an upper MOS transistor constituted of the semiconductor thin film 11, the source electrode 12, the drain electrode 13 and the top gate electrode 21, and a lower MOS transistor constituted of the semiconductor thin film 11, the source electrode 12, the drain electrode 13 and the bottom gate electrode 22. As is indicated by the equivalent circuit of FIG. 16B, the double-gate photosensor 10 is considered to include two MOS transistors having a common channel region formed of the semiconductor thin film 11, TG (a Top Gate Terminal), BG (a Bottom Gate Terminal), S (a Source Terminal) and D (a Drain Terminal).

The protective insulating film 20, the top gate electrode 21, the upper gate insulating film 15, the block insulating film 14 and the lower gate insulating film 16 are all formed of a material having a high transmittance of visible light for activating the semiconductor thin film 11. Light entering the sensor from the top gate electrode 21 side passes through the top gate electrode 21, the upper gate insulating film 15 and the block insulating film 14, and then enters the semiconductor thin film 11, thereby generating and accumulating charges (positive holes) in the channel region.

FIG. 17 is a schematic view illustrating a photosensor system formed of two-dimensionally arranged double-gate photosensors 10. As shown in FIG. 17, the photosensor system comprises a sensor array 100 that is constituted of a large number of double-gate photosensors 10 arranged in a matrix of (n×m), top gate lines 101 that connect the top gate terminals TG of the double-gate photosensors 10 in a row direction, bottom gate lines 102 that connect the bottom gate terminals BG of the photosensors 10 in a row direction, a top gate driver 111 and a bottom gate driver 112 connected to the top gate lines 101 and the bottom gate lines 102, respectively, data lines 103 that connect the drain terminals of the double-gate photosensors 10 in a column direction, and an output circuit section 113 connected to the data lines 103.

In FIG. 17, φtg and φbg represent control signals for generating a reset pulse signal φTi and a readout pulse signal φBi, respectively, which will be described later, and φpg represents a pre-charge pulse signal for controlling the point in time at which a pre-charge voltage Vpg is applied.

In the above-described structure, as described later, the photosensing function is realized by applying a predetermined voltage to the top gate terminals TG from the top gate driver 111, while the readout function is realized by applying a predetermined voltage to the bottom gate terminals BG from the bottom gate driver 112, then sending the output voltage of the photosensors 10 to the output circuit section 113 via the data lines 103, and outputting a serial data Vout.

FIGS. 18A–18D are timing charts illustrating a method for drive-controlling the photosensor system, and indicating a detecting operation period (an i-th row processing cycle) at the i-th row of the sensor array 100. First, a high level pulse voltage (a reset pulse signal; Vtg =+15 V, for example) φTi as shown in FIG. 18A is applied to the top gate line 101 of the i-th row, and during a reset period $T_{reset}$, a resetting operation for discharging the double-gate photosensors 10 of the i-th row is executed.

Subsequently, a bias voltage φTi of a low level (e.g. Vtg=−15 V) is applied to the top gate line 101 of the i-th row, thereby finishing the resetting period $T_{reset}$ and starting a charge accumulating period Ta in which the channel region is charged. During the charge accumulating period Ta, charge (positive holes) corresponding to the amount of light entering each sensor from the top gate electrode side are accumulated in the channel region.

Then, a pre-charge pulse signal φpg shown in FIG. 18C and having a pre-charge voltage Vpg is applied to the data lines 103 during the charge accumulating period Ta, and after a pre-charge period $T_{prch}$ for making the drain electrodes 13 keep a charge, a bias voltage (a readout pulse signal φBi) of a high level (e.g. Vbg=+10 V) shown in FIG. 18B is applied to the bottom gate line 102 of the i-th row. At this time, the double-gate photosensors 10 of the i-th row are turned on to thereby start a readout period $T_{read}$.

During the readout period $T_{read}$, the charge accumulated in the channel region serves to moderate a low level voltage (e.g. Vtg=−15 V) of an opposite polarity applied to each top gate terminal TG. Therefore, an n-type channel is formed by the voltage Vbg at each bottom gate terminal BG, whereby the voltage VD at the data lines 103 gradually reduces, in accordance with the drain current, with lapse of time after the pre-charge voltage Vpg is applied. More specifically, the tendency of change in the voltage VD at the data lines 103 depends upon the charge accumulating period Ta and the amount of received light. As shown in FIG. 18D, the voltage VD tends to gradually reduce when the incident light is dark, i.e. a small amount of light is received, and hence only a small amount of charge is accumulated, whereas it tends to suddenly reduce when the incident light is bright, i.e. a large amount of light is received, and hence a large amount of charge is accumulated. From this, it is understood that the amount of radiation can be calculated by detecting the voltage VD at the data lines 103 a predetermined period after the start of the readout period $T_{read}$, or by detecting a period required until the voltage VD reaches a predetermined threshold voltage.

Image reading is performed by sequentially executing the above-described drive-control for each line of the sensor array 100, by executing the control for each line in a parallel manner at different time points at which the driving pulses do not overlap.

Although the case of using the double-gate photosensor has been described above, even in a photosensor system using a photodiode or a phototransistor as a photosensor, sequential operations of "resetting operation→charge accumulating operation pre-charge operation→reading operation" are executed, and similar control is also executed.

The conventional photosensor systems as above have the following problems.

(1) In an image reading operation employed in the above-described conventional photosensor system drive-control method, when using, for example, the above-described double-gate photosensor as a photosensor, a series of operations are repeated which include application of a reset pulse signal to the top gate terminal TG, application of a pre-charge pulse signal to the drain terminal and application of a readout pulse signal to the bottom gate terminal BG. In this case, each pulse signal has a short pulse wave to be generated for a short time. For example, a high level voltage (e.g. +15 V) is applied for a short time to the top gate terminal TG, and a low level voltage (e.g. −15 V) is applied thereto during the other period. Thus, during the operation period (e.g. the i-th row processing cycle shown in FIGS. 18A–18D), the waveform of a voltage signal applied to the top gate terminal TG is asymmetrical with respect to 0 V (GND level). The effective voltage applied to the top gate terminal TG is Vte shown in FIG. 18A, which is greatly biased to the low level side (negative voltage side). Similarly, a high level voltage (e.g. +10 V) is applied for a short time to the bottom gate terminal BG, and a low level voltage (GND level) is applied thereto during the other period. Thus, the waveform of a voltage signal applied to the bottom gate terminal TG is asymmetrical with respect to 0 V (GND level). The effective voltage applied to the bottom gate terminal BG is Vbe shown in FIG. 18B, which is greatly biased to the high level side (positive voltage side).

If, in a photosensor having a thin film transistor structure, such a biased voltage is continuously applied to each gate terminal in a state in which light is applied to the sensor, for example, charge (positive holes or electrons) is trapped in each gate electrode, thereby degrading the element characteristics of the photosensor and hence changing its sensitivity. As a result, the reliability of the photosensor reduces.

(2) Further, when a photosensor system using the aforementioned photosensors is used in various places or used to pick up images of various types of subjects, the subjects may have different brightnesses and these brightnesses may be varied depending upon the states of their environments. In order to accurately read images of various types of subjects in various environments, it is necessary to set the sensitivity of the photosensor to a value suitable for each subject and/or environment, and to read its image at the set sensitivity. The sensitivity of the photosensor is determined from, for example, the amount of charge accumulated within the charge accumulating period, i.e. corresponding to the total amount of incident light during the period. Accordingly, the sensitivity can be adjusted by adjusting the charge accumulating period. This being so, even when the effective voltage applied to each gate terminal is set at an optimal value, if the charge accumulating period is changed to a value appropriate for each environment, the effective voltage applied to each gate terminal will inevitably change and deviate from the optimal value. This changes, for example, the aforementioned sensitivity characteristic, thereby making it difficult to secure sufficient reliability of the image reading apparatus.

BRIEF SUMMARY OF THE INVENTION

It is an object of the invention to provide a highly reliable photosensor system having photosensors of a thin film transistor structure, wherein each photosensor is free from significant degradation of its element characteristics and hence a great change in its sensitivity characteristic, which is caused when the effective voltage of a signal applied to each gate electrode of each photosensor is biased to a positive or negative voltage side.

It is another object of the invention to prevent degradation of the element characteristics of each photosensor and to minimize the reduction of the reliability of the photosensor system, even where an appropriate reading sensitivity is set for each photosensor in accordance with the environment of use, and a reading operation is executed at the set sensitivity.

To attain the objects, the invention provides a photosensor system which comprises a photosensor array having a plurality of photosensors arranged two-dimensionally, a driver circuit and a readout circuit for applying signal voltages to each photosensor, a control circuit having a function of controlling the voltages applied to each photosensor and adjusting the sensitivity of each photosensor, and a RAM storing data related to the control of the photosensor system.

The invention also provides a method for drive-controlling the photosensor system, characterized in that a correction signal, which has an effective voltage that can adjust an effective voltage, applied to each gate electrode of each photosensor during the entire operation period, to 0 V, or to a value that minimizes degradation of the characteristics of each photosensor, is generated on the basis of a waveform obtained by reversing the polarity of a voltage signal applied to each gate electrode of each photosensor during the resetting and reading operations executed for the photosensors in an image reading period, or by adjusting the timing of generation of a signal waveform. This correction signal is applied to each gate electrode.

The method for drive-controlling the photosensor system is also characterized in that, even where a tentative image reading for determining an optimal sensitivity for each photosensor in accordance with the environment of use is executed immediately before a regular reading operation for reading a subject image, thereby executing the regular reading operation at the determined optimal sensitivity, that correction signal is generated on the basis of a charge accumulating period corresponding to the set optimal reading sensitivity, and applied to each gate electrode of each photosensor, which can adjust, to optimal values, effective voltages applied to each gate electrode of each photosensor during the entire operation period, by offsetting effective voltages applied thereto during the tentative image reading operation for setting an optimal sensitivity and during the regular image reading operation.

These control methods can correct, to an optimal value, a biased effective voltage applied to each gate electrode of each photosensor during the resetting and reading operations, thereby minimizing degradation of the element characteristics of each photosensor and a change in its sensitivity characteristic caused by the degradation. As a result, a highly reliable photosensor system can be provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A–2H are timing charts showing operation timing at each row employed in a photosensor control method according to a first embodiment of the invention;

FIGS. 4A–4H are timing charts showing operation timing at each row employed in a photosensor control method according to a second embodiment of the invention;

FIGS. 5A and 5B are timing charts specifically illustrating the waveforms of voltage signals applied to the photosensor in the second embodiment;

FIGS. 6A–6H are timing charts showing operation timing at each row employed in a photosensor control method according to a third embodiment of the invention;

FIGS. 7A and 7B are timing charts specifically illustrating the waveforms of voltage signals applied to the photosensor in the third embodiment;

FIGS. 9A–9H are timing charts showing operation timing at each row employed in a photosensor control method according to a fourth embodiment of the invention;

FIGS. 11A–11H are timing charts showing operation timing at each row employed in a photosensor control method according to a fifth embodiment of the invention;

FIGS. 12A and 12B are timing charts specifically illustrating the waveforms of voltage signals applied to the photosensor in the fifth embodiment;

FIGS. 13A–13H are timing charts showing operation timing at each row employed in a photosensor control method according to a sixth embodiment of the invention;

FIGS. 15A–15H are timing charts illustrating another pre-reading operation executed in the sixth embodiment;

FIGS. 18A–18D are timing charts showing a conventional method for controlling the double-gate photosensor system.

DETAILED DESCRIPTION OF THE INVENTION

Methods for controlling a photosensor system according to the embodiments of the invention will be described in detail with reference to the accompanying drawings. Although in the embodiments described below, the double-gate photosensor having a thin film transistor structure is used as a photosensor, the invention is not limited to the double-gate photosensor, but also applicable to a photosensor system using another type of photosensor.

Figure 1:
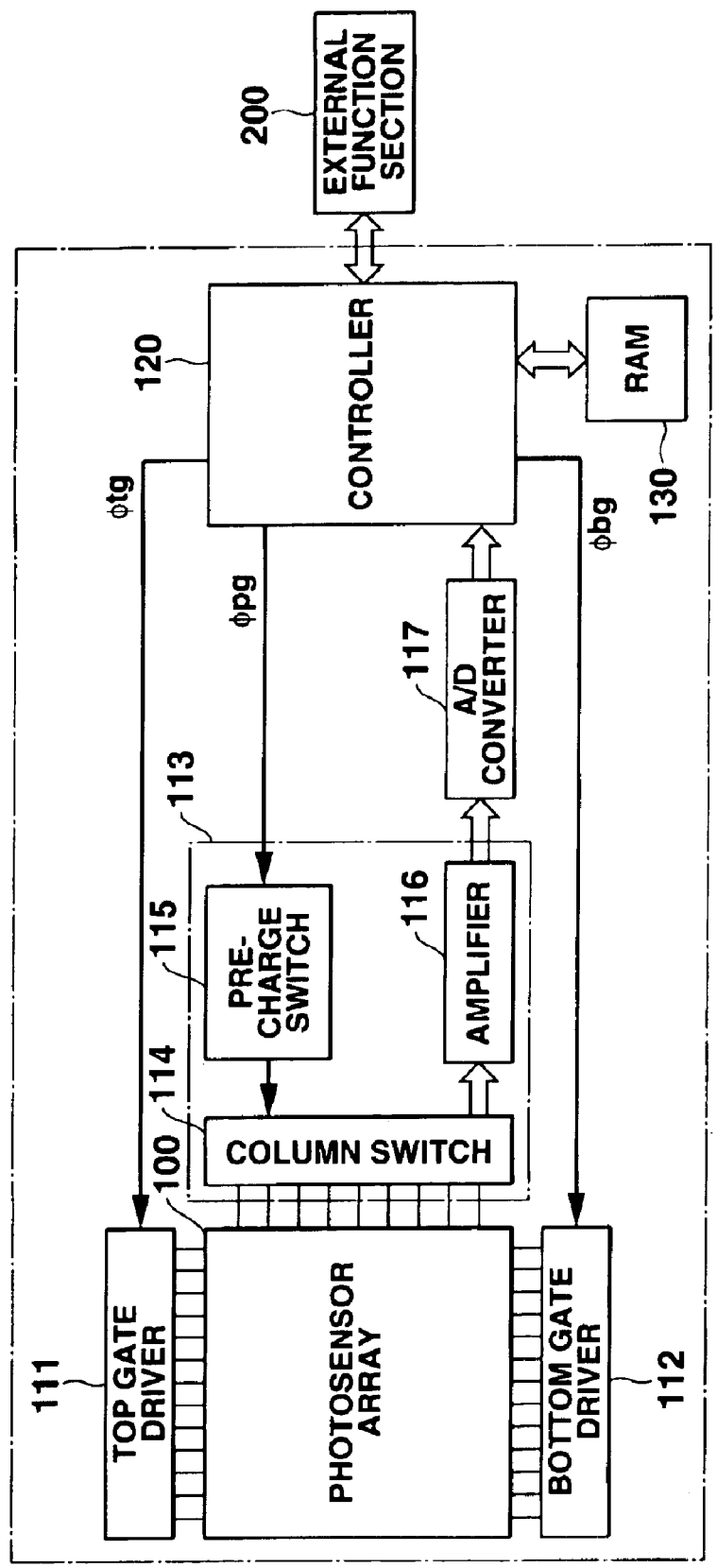
FIG. 1 is a block diagram showing a photosensor system according to the invention.
Figure 16A:
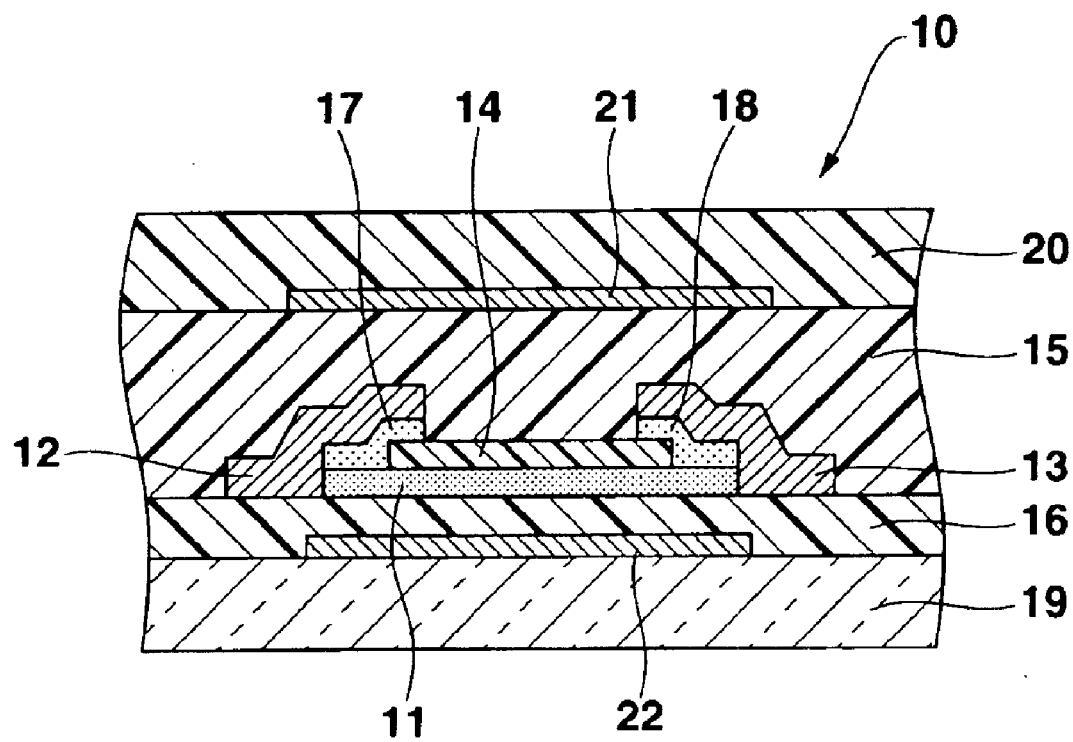
FIG. 16A is a sectional view showing the structure of a double-gate photosensor.
Figure 16B:
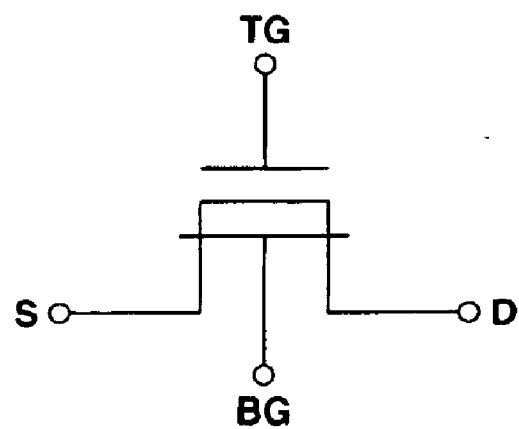
FIG. 16B is a diagram showing a circuit equivalent to the double-gate photosensor.

As is shown in FIG. 1, the photosensor system of the invention comprises a photosensor array 100 including double-gate photosensors 10, as shown in FIG. 16A, arranged two-dimensional; a top gate driver 111 for applying a predetermined reset pulse signal to the top gate terminal TG of each double-gate photosensor 10 at a predetermined point in time; a bottom gate driver 112 for applying a predetermined readout pulse signal to the bottom gate terminal BG of each double-gate photosensor 10 at a predetermined point in time; an output circuit section 113 constructed by a column switch 114 and a pre-charge switch 115 for reading a data line voltage and applying a pre-charge voltage to each double-gate photosensor 10, respectively, a pre-charge switch 115 and an amplifier 116; an analog/digital converter (hereinafter referred to as an "A/D converter") 117 for converting the read data voltage as an analog signal into image data as a digital signal; a controller 120 which is adapted to control the operation of reading an image of a subject by the photosensor array 100, to execute adjustment of the effective voltage according to the invention, and to exchange data with an external function section 200, and which has a sensitivity setting function described later; and a RAM 130 that stores, for example, read image data, data related to setting of a reading sensitivity described later or adjustment of the effective voltage.

Figure 17:
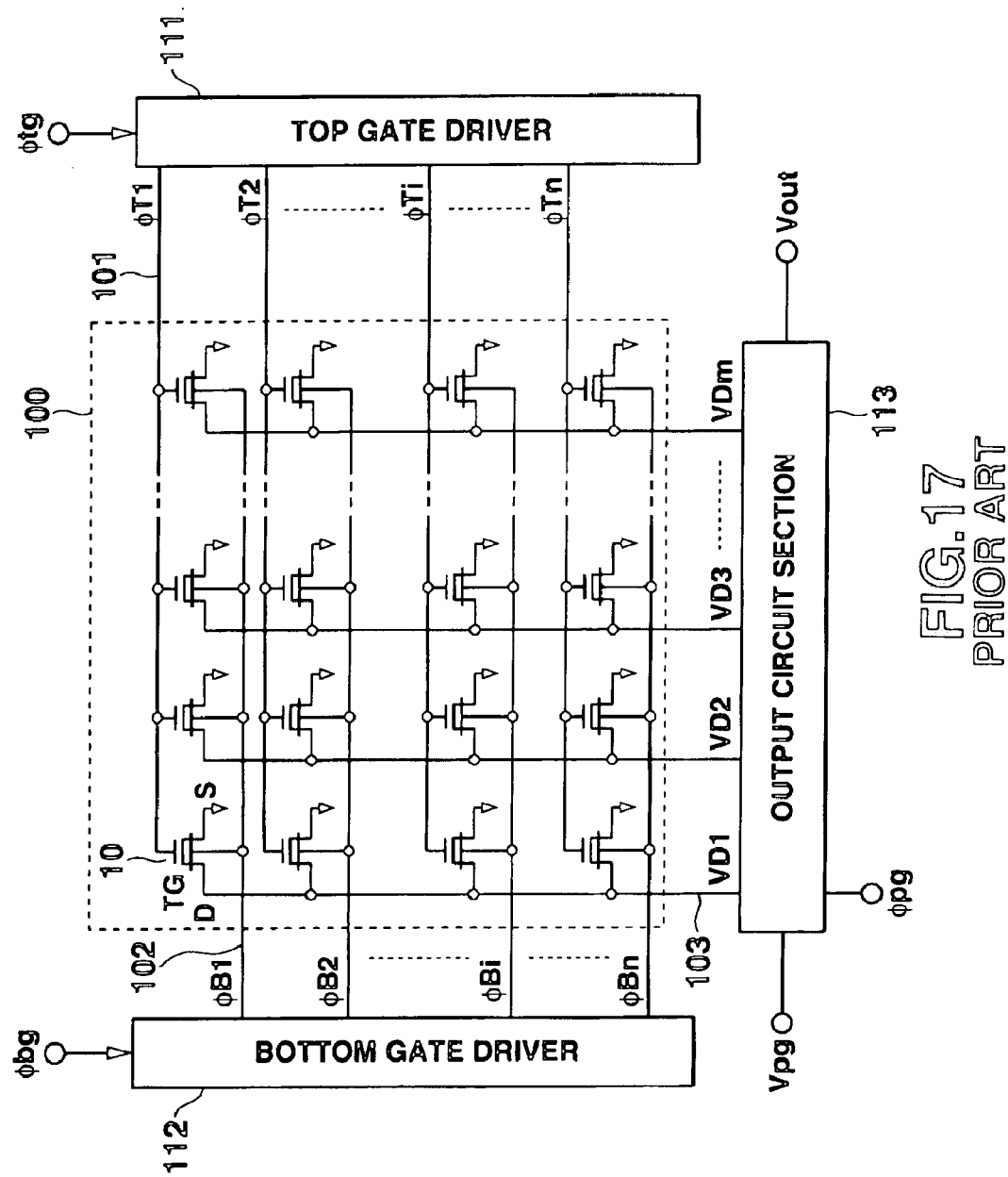
FIG. 17 is a diagram showing the circuit structure of the photosensor system in which double-gate photosensors are arranged two-dimensional.

The structure including the photosensor array 100, the top gate driver 111, the bottom gate driver 112 and the output circuit section 113 is the same as and has the same function as the conventional photosensor system shown in FIG. 17. In addition to this structure, the photosensor system of the present invention also comprises the A/D converter 117, the controller 120 and the RAM 130, which enable various types of control as described below.

Specifically, the controller 120 outputs control signals φtg and φbg to the top gate driver 111 and the bottom gate driver 112, respectively, which, in turn, output predetermined signal voltages (a reset pulse signal φTi and a readout pulse signal φBi) to the top gate terminal TG and the bottom gate terminal BT of each double-gate photosensor 10 of the photosensor array 100, respectively. The controller also outputs a control signal φpg to the pre-charge switch 115, which, in turn, applies a pre-charge voltage Vpg to the data lines. As a result, an image of a subject is read. The data line voltage VD read from each double-gate photosensor 10 is converted into a digital signal via the amplifier 116 and the A/D converter 117, and supplied as image data to the controller 120. The controller 120 also has a function of executing predetermined image processing on the image data, writing or reading image data into or from the RAM 130. It serves as an interface for the external function section 200 that executes predetermined processing such as image data identification, modification, etc. The controller 120 has, as described later, another function of controlling control signals φtg and φbg to be output to the top gate driver 111 and the bottom gate driver 112 to thereby adjust, to optimal values, the effective voltages applied to the top gate terminal TG and the bottom gate terminal BG of each double-gate photosensor 10, and yet another function of setting an optimal reading sensitivity for reading an image of a subject in accordance with ambient illumination such as outside light, i.e. a function of setting an optimal light accumulating period Ta for each double-gate photosensor 10.

Methods for controlling the photosensor system constructed as above will be described with reference to related figures including FIGS. 1 and 17 that show the structure of the system.

As described below, in a photosensor system control method according to each embodiment, each operation is controlled on the basis of a control signal (φtg, φbg, φpg, etc.) supplied from the controller 120.

<First Embodiment>

FIGS. 2A–2H are timing charts illustrating operation timing at each row employed in the photosensor system control method of the first embodiment of the invention. The first embodiment is directed to a case where the high and low levels of each of a reset pulse signal applied to each top gate line 101 and a readout pulse signal applied to each bottom gate line 102 have opposite polarities (with respect to the GND level (0 V)) and the same absolute value.

In the control method of this embodiment, at first, reset pulse signals φT1, φT2, ... φTn are sequentially applied to the top gate lines 101, thereby sequentially starting reset periods $T_{reset}$ for respective rows and initializing the double-gate photosensors 10 at respective rows, as is shown in FIGS. 2A–2C. The reset pulse signals φT1, φT2, ... φTn each have a positive voltage (high level) VtgH and a negative voltage (low level) VtgL. The voltages VtgH and VtgL have shapes which have opposite polarities but symmetrical with respect to the GND level (0 V).

The reset pulses φT1, φT2, ... φTn sequentially fall to sequentially finish the reset periods $T_{reset}$ and start respective light accumulating periods Ta, whereby charges (positive holes) are generated and accumulated in each channel region in accordance with the amount of light entering the double-gate photosensors 10 at each row from their top gate electrode side. During the light accumulating period Ta, the pre-charge signal φpg is sequentially applied thereby to start the pre-charge period $T_{prch}$ as shown in FIG. 2G. As a result, the pre-charge voltage $V_{prch}$ is applied to each data line 103, thereby executing a pre-charge operation for causing the drain electrode of each double-gate photosensor 10 to keep a predetermined voltage.

After that, as shown in an image reading operation period shown in FIGS. 2D–2F, readout pulse signals φB1, φB2, ... φBn are sequentially applied to those double-gate photosensors 10 via the bottom gate lines 102 of respective rows, at which the light accumulating period Ta and the pre-charge period $T_{prch}$ have elapsed, thereby sequentially starting the readout periods $T_{read}$, sequentially reading a voltage change VD, which corresponds to charges accumulated in each double-gate photosensor 10, from the output circuit section 113 via a corresponding data line 103, and sequentially storing the read voltage change in the RAM 130. The readout pulse signals φB1, φB2, ... φBn each have a positive voltage (high level) VbgH and a negative voltage (low level) VbgL. The voltages VbgH and VbgL have opposite polarities but symmetrical values with respect to the GND level (0 V).

The amount of radiation is calculated, as in the conventional case, by detecting the voltage VD at the data lines 103 a predetermined period after the start of the readout period $T_{read}$, or by detecting a period required until the voltage VD reaches a predetermined threshold voltage.

After the above-described series of image reading operations (the reset operation→the light accumulating operation→the pre-charge operation the readout operation) are executed for all rows of the photosensor array 100, a voltage, serving as a reverse bias with respect to the voltage applied to the top and bottom gate lines 101 and 102 of each row in the image reading operation, is applied to the top and bottom gate lines 101 and 102 of each row.

Specifically, in the reset operation executed during the effective voltage adjusting period shown in FIGS. 2A–2C, a voltage signal of a waveform is generated, as a correction signal for each top gate line 101, which has a polarity opposite to that of the reset pulse signal φT1, φT2, ... φTn applied to the top gate terminal TG of each double-gate photosensor 10, i.e. a voltage signal of a waveform is generated which is obtained by inverting, with respect to the GND level (0 V), the waveform of a voltage signal applied to the top gate terminal TG of each double-gate photosensor 10 in the image reading period. The generated voltage signal is applied immediately before or after the image reading period (FIGS. 2A–2C show cases where the signal application is executed immediately after the image reading period).

Similarly, in the readout operation executed during the effective voltage adjusting period shown in FIGS. 2D–2F, a voltage signal of a waveform is generated, as a correction signal for each bottom gate line 102, which has a polarity opposite to that of the readout pulse signal φB1, φB2, ... φBn applied to the bottom gate terminal BT of each double-gate photosensor 10, i.e. a voltage signal of a waveform is generated which is obtained by inverting, with respect to the GND level (0 V), the waveform of a voltage signal applied to the bottom gate terminal BG of each double-gate photosensor 10 in the image reading period. The generated voltage signal is applied immediately before or after the image reading period (FIGS. 2D–2F show cases where the signal application is executed immediately after the image reading period).

A more detailed description will be given of the waveforms of the voltage signals applied to the top and bottom gate terminals TG and BG of each double-gate photosensor 10.

Figures 3A, 3B:
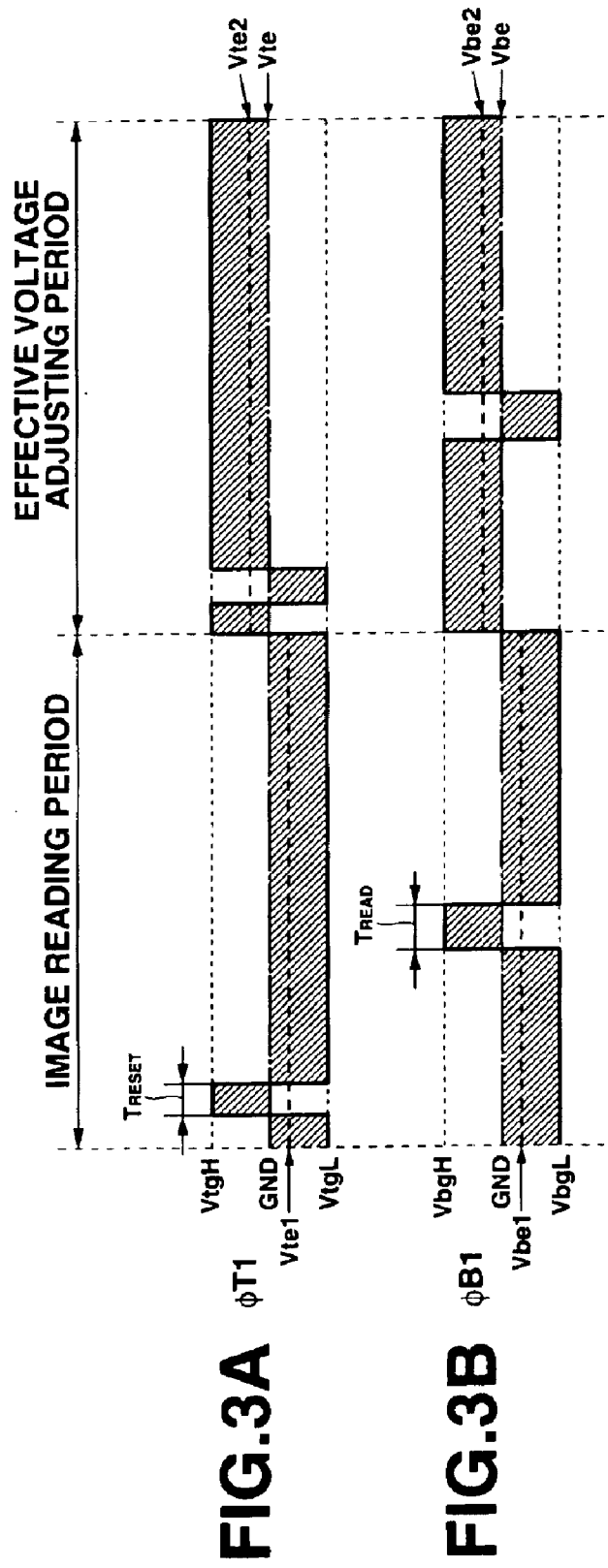
FIGS. 3A and 3B are timing charts specifically illustrating the waveforms of voltage signals applied to the photosensor in the first embodiment.

FIGS. 3A and 3B are timing charts illustrating in detail the waveforms of the voltage signals applied to the top and bottom gate terminals TG and BG of each double-gate photosensor 10 in this embodiment. Although these figures show only the waveforms of voltage signals applied to the top and bottom gate lines of a first row, similar voltage signals are applied to the gate lines of the other rows.

As is shown in FIG. 3A, when executing the reset operation during the image reading operation, a reset pulse signal φT1 of the positive voltage VtgH is applied for only a very short period (for the reset period $T_{reset}$) to the top gate terminal TG of each double-gate photosensor via corresponding top gate line 101. During a relatively long period other than the reset period, a negative voltage VtgL is applied thereto. Thus, the effective voltage applied to each top gate terminal TG is greatly biased to the negative voltage side.

On the other hand, also in the readout operation, a readout pulse signal φB1 of the positive voltage VbgH is applied for only a very short period (for the readout period $T_{read}$) to the bottom gate terminal BG of each double-gate photosensor via a corresponding bottom gate line 102, as is shown in FIG. 3B. During a relatively long period other than the readout period, a negative voltage VbgL is applied thereto. Thus, the effective voltage applied to each bottom gate terminal BG is greatly biased to the negative voltage side. When a voltage signal having a waveform biased to one polarity side is continuously applied to a gate terminal, charges (positive holes or electrons) are trapped in the gate section, thereby changing the sensitivity characteristic of the photosensors or degrading their element characteristics.

To avoid this, in this embodiment, a correction signal of a reversely biased waveform, which is obtained by inverting the polarity of the voltage signal applied during the image reading period with respect to the GND level (0 V), is generated and applied to each gate electrode immediately before the image reading period or during the effective voltage adjusting period immediately after the image reading period. In this control method for the photosensor system, voltage signals are applied to the top or bottom gate terminal TG or BG at a similar timing during the image reading period and the effective voltage adjusting period, and have the same time integral value but opposite polarities. Accordingly, during the entire operation period including the image reading period and the effective voltage adjusting period, the voltage signals applied to the top or bottom gate terminal TG or BG are offset to thereby eliminate the biased polarity of the effective voltage.

More specifically, suppose that, as shown in FIGS. 3A and 3B, the effective voltages applied to the top and bottom gate terminals TG and BG in the image reading period are Vte1 and Vbe1, respectively, and the effective voltages applied to the top and bottom gate terminals TG and BG in the effective voltage adjusting period are Vte2 and Vbe2, respectively. In this case, the effective voltages applied to the terminals during both the periods have the same absolute value and different polarities, and |Vte1|=|Vte2| and |Vbe1|=|Vbe2| are established. Accordingly, the average voltages (average effective voltages) Vte and Vbe applied to the top and bottom gate terminals TG and BG during the entire operation period including the image reading period and the effective voltage adjusting period are 0 V since the effective voltages applied to the top or bottom gate terminals TG or BG in both the periods are offset. As a result, accumulation of charges (positive holes or electrons) in the gate section is prevented, and hence degradation of the element characteristics or the sensitivity characteristic of each photosensor can be minimized.

Further in the embodiment, during the image reading operation and the effective voltage adjusting period, voltages necessary for a signal to be applied to each top gate terminal TG are a pair of positive and negative voltages VtgH and VtgL (=−VtgH), which have opposite polarities with respect to the GND level (0 V). Similarly, voltages necessary for a signal to be applied to each bottom gate terminal BG are a pair of positive and negative voltages VbgH and VbgL (=−VbgH), which have opposite polarities with respect to the GND level (0 V). Accordingly, each of the top gate driver 111 and the bottom gate driver 112 can be formed of a driver of a two-value output. Since this type of driver is cheap, the photosensor system using such drivers can be made at a low cost.

<Second Embodiment>

A method for controlling a photosensitive system according to a second embodiment of the invention will be described with reference to FIGS. 4A–5B.

This embodiment differs from the first embodiment in that, in the former, the reset pulse signal and the readout pulse signal used in the image reading period each have a high level voltage and a low level voltage which are asymmetrical with respect to the GND level (0 V).

FIGS. 4A–4H are timing charts illustrating operation timing at each row employed in the photosensor system control method of the second embodiment of the invention. FIGS. 5A and 5B are timing charts illustrating in detail the waveforms of the voltage signals applied to the top and bottom gate terminals TG and BG of each double-gate photosensor 10 in this embodiment. The same control as employed in the above-described first embodiment will not be described in detail.

In the control method of this embodiment, at first, reset pulse signals φT1, φT2, . . . φTn shown in FIGS. 4A–4C are sequentially applied to the top gate lines 101, thereby sequentially starting reset periods $T_{reset}$ for respective rows, initializing the double-gate photosensors 10 at the respective rows, and starting respective light accumulating periods Ta. As a result, charges (positive holes) corresponding to the amount of incident light are accumulated in each channel region. Each of the reset pulse signals φT1, φT2, . . . φTn has a positive voltage (high level) VtgH2 and a negative voltage (low level) VtgL1 (≠−VtgH2), which are asymmetrical with respect to the GND level (0 V).

After that, readout pulse signals φB1, φB2, . . . φBn as shown in FIGS. 4D–4F are sequentially applied to those double-gate photosensors 10 via the bottom gate lines 102 of respective rows, at which the light accumulating period Ta and the pre-charge period $T_{prch}$ have passed, thereby sequentially starting readout periods Tread, sequentially reading a voltage change VD shown in FIG. 4H, which corresponds to charges accumulated in each double-gate photosensor 10, from the output circuit section 113 via a corresponding data line 103, and sequentially storing the read voltage change in the RAM 130. The readout pulse signals φB1, φB2, . . . φBn each have a positive voltage (high level) VbgH2 and a negative voltage (low level) VbgL1 that are asymmetrical with respect to the GND level (0 V).

After the above-described series of image reading operations are executed for all rows of the photosensor array 100, correction signals, serving as reverse bias signals with respect to voltage signals applied to the top and bottom gate lines 101 and 102 of each row during the image reading operation, are applied to the top and bottom gate lines 101 and 102 of each row for a period identical to the period required for the image reading operation at all rows during the effective voltage adjusting period immediately after the image reading period. Alternatively, this signal application may be executed immediately before the image reading period.

More specifically, as shown in FIGS. 5A and 5B, a correction signal, which is created by inverting the polarity of a voltage signal applied to each top gate terminal TG during the image reading period with respect to the GND level (0 V), and which has a positive voltage VtgH1 (=−VtgL1) as a high level voltage and a negative voltage VtgL2 (=−VtgH2) as a low voltage, is applied to each top gate terminal TG during the effective voltage adjusting period. On the other hand, a correction signal, which is created by inverting the polarity of a voltage signal applied to each bottom gate terminal BG during the image reading period with respect to the GND level (0 V), and which has a positive voltage VbgH1 (=−VbgL1) as a high level voltage and a negative voltage VbgL2 (=−VbgH2) as a low voltage, is applied to each bottom gate terminal BG during the effective voltage adjusting period.

In this control method for the photosensor system, voltage signals are applied to the top or bottom gate terminal TG or BG at a similar timing during the image reading period and the effective voltage adjusting period, and have the same time integral value but opposite polarities. Accordingly, during the entire operation period including the image reading period and the effective voltage adjusting period, the average voltages Vte and Vbe applied to the top and bottom gate terminals TG and BG are 0 V, thereby preventing accumulation of charge (positive holes or electrons) in each gate electrode, and hence minimizing a change in the sensitivity characteristic of the photosensors or degradation of their element characteristics.

Since in this embodiment, the high level and low level voltages of each of the reset pulse signal and the readout pulse signal used during the image reading period are asymmetrical with respect to the GND level (0 V), voltages necessary for a signal to be applied to each of the top and bottom gate terminals TG and BG during the image reading period and the effective voltage adjusting period are two positive voltages and two negative voltages, i.e. four voltages in total, which are asymmetrical with respect to the GND level (0 V). Accordingly, each of the top and bottom gate drivers 111 and 112 can be formed of a driver of a multi-level output. This enables application of an appropriate voltage for the sensitivity characteristic of each photosensor, and hence enables an appropriate image reading operation.

<Third Embodiment>

A method for controlling a photosensitive system according to a third embodiment of the invention will be described with reference to FIGS. 6A–7B.

This embodiment is directed to a case similar to the second embodiment, where the reset pulse signal and the readout pulse signal used in the image reading period each have a high level voltage and a low level voltage which are asymmetrical with respect to the GND level (0 V).

FIGS. 6A–6H are timing charts illustrating operation timing at each row employed in the photosensor system control method of the third embodiment of the invention. FIGS. 7A and 7B are timing charts illustrating in detail the waveforms of the voltage signals applied to the top and bottom gate terminals TG and BG of each double-gate photosensor 10 in this embodiment. The same control as employed in the above-described embodiments will not be described in detail.

In the control method of this embodiment, at first, reset pulse signals φT1, φT2, . . . φTn shown in FIGS. 6A–6C are sequentially applied to the top gate lines 101, thereby sequentially starting reset periods $T_{reset}$ for respective rows, initializing the double-gate photosensors 10 at the respective rows, and starting respective light accumulating periods Ta. As a result, charges (positive holes) corresponding to the amount of incident light are accumulated in each channel region. Each of the reset pulse signals φT1, φT2, . . . φTn has a positive voltage (high level) VtgH and a negative voltage (low level) VtgL (≠−VtgH), which are asymmetrical with respect to the GND level (0 V).

After that, readout pulse signals φB1, φB2, . . . φBn as shown in FIGS. 6D–6F are sequentially applied to those double-gate photosensors 10 via the bottom gate lines 102 of respective rows, at which the light accumulating period Ta and the pre-charge period $T_{prch}$ have passed, thereby sequentially starting readout periods $T_{read}$, sequentially reading a voltage change VD shown in FIG. 6H, which corresponds to charges accumulated in each double-gate photosensor 10, from the output circuit section 113 via a corresponding data line 103, and sequentially storing the read voltage change in the RAM 130. The readout pulse signals φB1, φB2, . . . φBn each have a positive voltage (high level) VbgH and a negative voltage (low level) VbgL (≠−VbgH) that are asymmetrical with respect to the GND level (0 V).

After the above-described series of image reading operations are executed for all rows of the photosensor array 100, correction signals having reverse bias voltage waveforms that offset, to thereby make them 0 V, the effective voltages applied to the top and bottom gate lines 101 and 102 of each row in the image reading operation, are applied to the top and bottom gate lines 101 and 102 of each row during the effective voltage adjusting period immediately after the image reading period. Alternatively, this signal application may be executed immediately before the image reading period.

Specifically, during the effective voltage adjusting period, a correction signal is generated and applied to each top gate terminal TG, which has the same positive and negative voltages VtgH and VtgL as the pulse signal applied thereto during the image reading period, and has an effective voltage Vte2 (=−Vte1) created by adjusting the signal widths of the positive and negative voltages VtgH and VtgL and inverting, with respect to the GND level (0 V), the polarity of an effective voltage Vte1 applied thereto during the image reading period. Further, during the effective voltage adjusting period, a correction signal is generated and applied to each bottom gate terminal BG, which has the same positive and negative voltages VbgH and VbgL as the pulse signal applied thereto during the image reading period, and has an effective voltage Vbe2 (=−Vbe1) created by adjusting the signal widths of the positive and negative voltages VbgH and VbgL and inverting, with respect to the GND level (0 V), the polarity of an effective voltage Vbe1 applied thereto during the image reading period.

More specifically, as shown in FIGS. 7A and 7B, during the effective voltage adjusting period, a correction signal is generated and applied to each top gate terminal TG, which has a positive voltage (high level) VtgH and a negative voltage (low level) VtgL, and has an effective voltage Vte2 created by inverting, with respect to the GND level (0 V), the polarity of an effective voltage Vte1 applied thereto during the image reading period. Further, during the effective voltage adjusting period, a correction signal is generated and applied to each bottom gate terminal BG, which has a positive voltage (high level) VbgH and a negative voltage (low level) VbgL, and has an effective voltage Vbe2 created by inverting, with respect to the GND level (0 V), the polarity of an effective voltage Vbe1 applied thereto during the image reading period. The effective voltage adjusting period may be identical to the period required for the image reading operation, or may be different from it, i.e. may be shorter than the period. In other words, it is sufficient if voltage signals are set such that the effective voltages applied to the top and bottom gate terminals TG and BG during the effective voltage adjusting period offset the effective voltages applied thereto during the image reading period.

In the above-described control method for the photosensor system, during the entire operation period including the image reading period and the effective voltage adjusting period, the average effective voltages Vte and Vbe applied to the top and bottom gate terminals TG and BG are 0 V (GND level), thereby preventing accumulation of charges (positive holes or electrons) in the gate section is prevented, and suppressing degradation of the element characteristics or the sensitivity characteristic of each photosensor.

Further in this embodiment, during the image reading operation and the effective voltage adjusting period, voltages necessary for each signal to be applied to the top and bottom gate lines 101 and 102 during the image reading period and the effective voltage adjusting period are a pair of positive and negative voltages, which have opposite polarities and are asymmetrical with respect to the GND level (0 V). Accordingly, each of the top gate driver 111 and the bottom gate driver 112 can be formed of a driver of a two-value output. Since this type of driver is cheap, the photosensor system using such drivers can be made at a low cost.

<Fourth Embodiment>

A method for controlling a photosensitive system according to a fourth embodiment of the invention will be described with reference to FIGS. 8–10B.

This embodiment is directed to a case similar to the second embodiment, where the reset pulse signal and the readout pulse signal used in the image reading period each have a high level voltage and a low level voltage which are asymmetrical with respect to the GND level (0 V). However, the fourth embodiment is characterized in that a reverse bias voltage waveform is set so as to minimize a change in the threshold value of a transistor that constitutes a photosensor.

Figure 8:
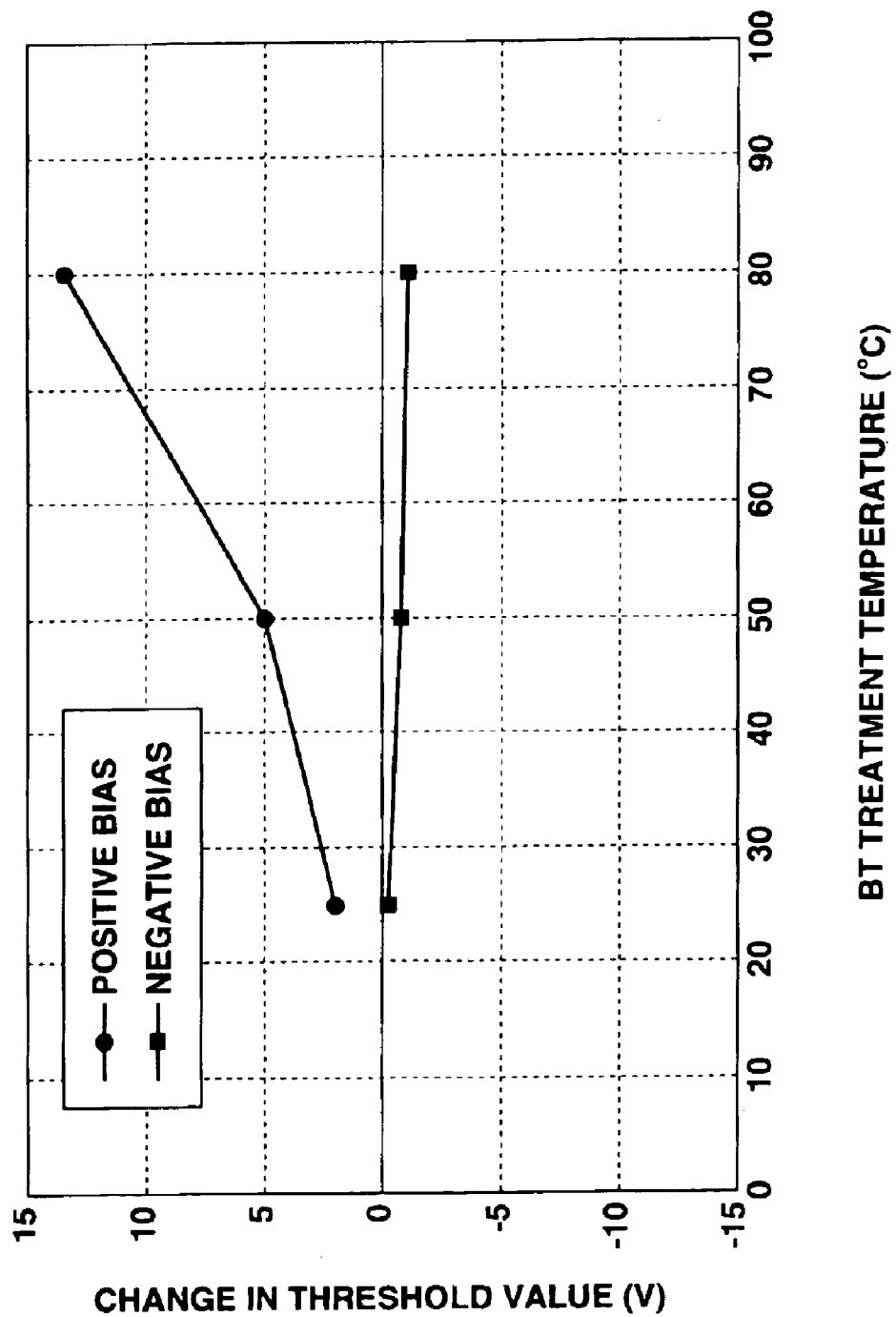
FIG. 8 is a graph illustrating the relationship between each bias voltage applied to the gate electrode of a transistor constituting a photosensor, the BT treatment temperature and the threshold voltage.

FIG. 8 shows the relationship between each bias voltage applied to the gate electrode of a transistor constituting a photosensor, the BT treatment temperature and the threshold voltage of the transistor. Changes in the threshold value after the BT treatment were measured by the CV measurement method.

In the examples shown in FIG. 8, the threshold voltage greatly changes from several volts to ten and several volts when a positive bias is applied to the gate electrode, while it slightly changes within a range of several volts or less when a negative bias is applied thereto. Accordingly, where the effective voltage applied to the gate electrode is 0 V, and the positive bias and the negative bias are applied for the same period, the sensitivity characteristic of the double-gate photosensor may change or its element characteristics may degrade since, as described above, the threshold voltage more greatly changes when the positive bias is applied, than when the negative bias is applied. Therefore, to reduce a change in the threshold voltage, it is preferable that the effective voltage applied to the gate electrode is biased to the negative voltage side. As aforementioned, in this embodiment, the effective voltage applied to the gate electrode is set at a value, other than 0 V, which minimizes a change in the threshold voltage. A reverse bias voltage signal created for this end is applied to each gate terminal immediately before or after the image reading period.

In the case of FIG. 8, the threshold voltage more greatly changes when the positive bias is applied, than when the negative bias is applied. However, this is just an example, and there is an opposite case where the threshold voltage more greatly changes when the negative bias is applied to the gate electrode. This difference depends upon the element structure, the used material, etc.

Figures 10A, 10B:
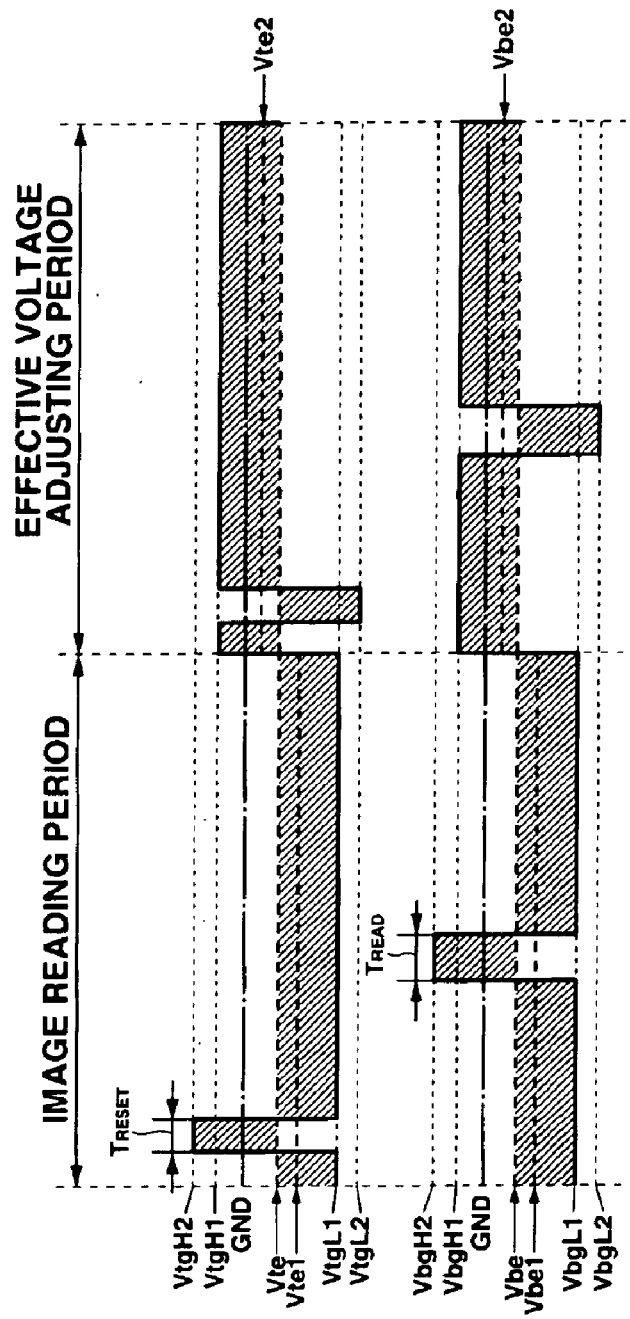
FIGS. 10A and 10B are timing charts specifically illustrating the waveforms of voltage signals applied to the photosensor in the fourth embodiment.

FIGS. 9A–9H are timing charts illustrating operation timing at each row employed in the photosensor system control method of the fourth embodiment of the invention. FIGS. 10A and 10B are timing charts illustrating in detail the waveforms of the voltage signals applied to the top and bottom gate terminals TG and BG of each double-gate photosensor in this embodiment. Like the second embodiment, the fourth embodiment is also directed to a case where the reset pulse signal and the readout pulse signal used in the image reading period each have a high level voltage and a low level voltage which are asymmetrical with respect to the GND level (0 V). The same control as employed in the above-described embodiments will not be described in detail.

In the control method of this embodiment, at first, reset pulse signals φT1, φT2, . . . φTn shown in FIGS. 9A–9C are sequentially applied to the top gate lines 101, thereby sequentially starting reset periods $T_{reset}$, initializing the double-gate photosensors 10 at respective rows, and starting respective light accumulating periods Ta. As a result, charge (positive holes) corresponding to the amount of incident light is accumulated in each channel region. Each of the reset pulse signals φT1, φT2, . . . φTn has a positive voltage (high level) VtgH2 and a negative voltage (low level) VtgL1 (≠−VtgH2), which are asymmetrical with respect to the GND level (0 V).

After that, readout pulse signals φB1, φB2, . . . φBn as shown in FIGS. 9D–9F are sequentially applied to those double-gate photosensors 10 via the bottom gate lines 102 of respective rows, at which the light accumulating period Ta and the pre-charge period $T_{prch}$ have passed, thereby sequentially starting readout periods $T_{read}$, sequentially reading a voltage change VD shown in FIG. 9H, which corresponds to charges accumulated in each double-gate photosensor 10, from the output circuit section 113 via a corresponding data line 103, and sequentially storing the read voltage change in the RAM 130. The readout pulse signals φB1, φB2, . . . φBn each have a positive voltage (high level) VbgH2 and a negative voltage (low level) VbgL1 (≠−VbgH2) that are asymmetrical with respect to the GND level (0 V).

After the above-described series of image reading operations are executed for all rows of the photosensor array, correction signals having reverse bias voltage waveforms that offset and minimize a change in the threshold voltage of each transistor, which occurs depending upon the polarities of voltages applied to the top and bottom gate lines 101 and 102 of each row in the image reading operation, are applied to the top and bottom gate lines 101 and 102 of each row during the effective voltage adjusting period immediately after the image reading period. Alternatively, this signal application may be executed immediately before the image reading period.

Specifically, during the effective voltage adjusting period, a correction signal is generated and applied to each top gate terminal TG, which is obtained by inverting the polarity of a voltage signal applied thereto during the image reading period, with respect to an optimal voltage Vte set so as to minimize, or to make 0, a change in the threshold value of a top gate terminal TG side transistor of each double-gate photosensor 10, and which has a positive voltage VtgH1 (high level) and a negative voltage VtgL2 (low level).

Further, during the effective voltage adjusting period, a correction signal is generated and applied to each bottom gate terminal BG, which is obtained by inverting the polarity of a voltage signal applied thereto during the image reading period, with respect to an optimal voltage Vbe set so as to minimize a change in the threshold value of a bottom gate terminal BG side transistor of each double-gate photosensor 10, and which has a positive voltage (high level) VbgH1 and a negative voltage (low level) VbgL2.

More specifically, as shown in FIGS. 10A and 10B, the effective voltages Vte2 and Vbe2 of reverse bias voltage signals used during the effective voltage adjusting period are set on the basis of the effective voltages Vte1 and Vbe1 applied to respective gate electrodes during the image reading period, so that optimal voltages Vte and Vbe, which minimize, or make 0, a change in the threshold value of each transistor of each photosensor, can be obtained as average effective voltages during the entire process period including the image reading period and the effective voltage adjusting period. In other words, the reverse bias voltage signals are set so that the average values of the effective voltages Vte1 and Vbe1 applied during the image reading period, and the effective voltages Vte2 and Vbe2 applied during the effective voltage adjusting period are identical to the optimal voltages Vte and Vbe, respectively.

In the above-described control method for the photosensor system, reverse bias voltage signals are applied to the top gate terminal TG and the bottom gate terminal BG so that the average effective voltages during the entire process period including the image reading period and the effective voltage adjusting period can minimize, or make 0, a change in the threshold voltage of each transistor. Accordingly, the invention can provide a highly reliable photosensor system that can suppress the influence of a change in the threshold voltage of each transistor due to the polarities of voltages applied to the top and bottom gate terminals TG and BG, and hence can minimize degradation of the sensitivity characteristic or the element characteristics of each photosensor.

In this embodiment, voltages necessary for a signal to be applied to each of the top and bottom gate terminals TG and BG during the image reading period and the effective voltage adjusting period are two positive voltages and two negative voltages, i.e. four voltages in total, which are asymmetrical with respect to the GND level (0 V). Accordingly, each of the top and bottom gate drivers 111 and 112 can be formed of a driver of a multi-level output. This enables application of an appropriate voltage for the sensitivity characteristic of each photosensor, and hence enables an appropriate image reading operation.

<Fifth Embodiment>

A method for controlling a photosensitive system according to a fifth embodiment of the invention will be described with reference to FIGS. 11A–12B.

This embodiment is directed to a case similar to the fourth embodiment, where the reset pulse signal and the readout pulse signal used in the image reading period each have a high level voltage and a low level voltage which are asymmetrical with respect to the GND level (0 V), and is characterized in that a reverse bias voltage waveform is set so as to minimize a change in the threshold value of a transistor that constitutes a photosensor.

FIGS. 11A–11H are timing charts illustrating operation timing at each row employed in the photosensor system control method of the fifth embodiment of the invention. FIGS. 12A and 12B are timing charts illustrating in detail the waveforms of the voltage signals applied to the top and bottom gate terminals TG and BG of each double-gate photosensor in this embodiment. The same control as employed in the above-described embodiments will not be described in detail.

In the control method of this embodiment, at first, reset pulse signals $\phi T1, \phi T2, \ldots \phi Tn$ shown in FIGS. 11A–11C are sequentially applied to the top gate lines 101, thereby sequentially starting reset periods $T_{reset}$ for respective rows, initializing the double-gate photosensors 10 at the respective rows, and starting respective light accumulating periods Ta. As a result, charges (positive holes) corresponding to the amount of incident light are accumulated in each channel region. Each of the reset pulse signals $\phi T1, \phi T2, \ldots \phi Tn$ has a positive voltage (high level) VtgH and a negative voltage (low level) VtgL ($\neq -$VtgH), which are asymmetrical with respect to the GND level (0 V).

After that, readout pulse signals $\phi B1, \phi B2, \ldots \phi Bn$ as shown in FIGS. 11D–11F are sequentially applied to those double-gate photosensors 10 via the bottom gate lines 102 of respective rows, at which the light accumulating period Ta and the pre-charge period $T_{prch}$ have passed, thereby sequentially starting readout periods. $T_{read}$, sequentially reading a voltage change VD shown in FIG. 11H, which corresponds to charges accumulated in each double-gate photosensor 10, from the output circuit section 113 via a corresponding data line 103, and sequentially storing the read voltage change in the RAM 130. The readout pulse signals $\phi B1, \phi B2, \ldots \phi Bn$ each have a positive voltage (high level) VbgH2 and a negative voltage (low level) VbgL1 ($\neq -$VbgH2) that are asymmetrical with respect to the GND level (0 V).

After the above-described series of image reading operations are executed for all rows of the photosensor array, correction signals having reverse bias voltage waveforms that offset and minimize a change in the threshold voltage of each transistor, which occurs depending upon the polarities of voltages applied to the top and bottom gate lines 101 and 102 of each row in the image reading operation, are applied to the top and bottom gate lines 101 and 102 of each row during the effective voltage adjusting period immediately after the image reading period. Alternatively, this signal application may be executed immediately before the image reading period.

Specifically, during the effective voltage adjusting period, a correction signal is generated and applied to each top gate terminal TG, which is obtained by inverting the polarity of a voltage signal applied thereto during the image reading period, with respect to an optimal voltage Vte set so as to minimize, or to make 0, a change in the threshold value of a top gate terminal TG side transistor of each double-gate photosensor 10, and which has a positive voltage (high level) VtgH and a negative voltage (low level) VtgL, the widths of the positive voltage and negative voltage signal components being adjusted. Further, during the effective voltage adjusting period, a correction signal is generated and applied to each bottom gate terminal BG, which is obtained by inverting the polarity of a voltage signal applied thereto during the image reading period, with respect to an optimal voltage Vbe set so as to minimize a change in the threshold value of a bottom gate terminal BG side transistor of each double-gate photosensor 10, and which has a positive voltage (high level) VbgH and a negative voltage (low level) VbgL, the widths of the positive voltage and negative voltage signal components being adjusted.

More specifically, as shown in FIGS. 12A and 12B, the effective voltages Vte2 and Vbe2 of reverse bias voltage signals used during the effective voltage adjusting period are set on the basis of the effective voltages Vte1 and Vbe1 applied to each gate electrode during the image reading period, so that optimal voltages Vte and Vbe, which minimize, or make 0, a change in the threshold value of each transistor of each photosensor, can be obtained as average effective voltages during the entire process period including the image reading period and the effective voltage adjusting period. In other words, the reverse bias voltage signals are set so that the average voltages of the effective voltages Vte1 and Vbe1 applied during the image reading period, and the effective voltages Vte2 and Vbe2 applied during the effective voltage adjusting period are identical to the optimal voltages Vte and Vbe, respectively.

The effective voltage adjusting period may be identical to the period required for the image reading operation, or may be different from it, i.e. may be shorter than the period. In other words, it is sufficient if voltage signals are set such that the effective voltages applied to the top and bottom gate terminals TG and BG during the effective voltage adjusting period are identical to the average effective voltages Vte and Vbe.

In the above-described control method for the photosensor system, reverse bias voltage signals are applied to the top gate terminal TG and the bottom gate terminal BG so that the average effective voltages during the entire process period including the image reading period and the effective voltage adjusting period can minimize, or make 0, a change in the threshold voltage of each transistor. Accordingly, the invention can provide a highly reliable photosensor system that can suppress the influence of a change in the threshold voltage of each transistor due to the polarities of voltages applied to the top and bottom gate terminals TG and BG, and hence can minimize degradation of the sensitivity characteristic or the element characteristics of each photosensor.

In this embodiment, voltages necessary for a signal to be applied to each of the top and bottom gate terminals TG and BG during the image reading period and the effective voltage adjusting period are a pair of positive and negative voltages that are asymmetrical with respect to the GND level (0 V). Accordingly, each of the top and bottom gate drivers 111 and 112 can be formed of a driver of a two-value output. Since this type of driver is cheap, the photosensor system using such drivers can be made at a low cost.

<Sixth Embodiment>

A method for controlling a photosensitive system according to a sixth embodiment of the invention will be described with reference to FIGS. 13A–14B.

This embodiment is directed to a control method that includes, in addition to the step of reading an image of a subject as described in the first to fifth embodiments, the step of executing, immediately before the image reading period, an operation (hereinafter referred to as a "pre-reading operation") for determining an optimal sensitivity for the photosensor, which varies in accordance with various conditions such as the brightness of the environment, the type of a to be-detected subject, etc., and is used for the image reading operation.

FIGS. 13A–13H are timing charts illustrating operation timing at each row employed in the photosensor system control method of the sixth embodiment of the invention. The same control as employed in the above-described embodiments will not be described in detail. In this embodiment, the high and low level voltages of voltage signals applied to the top and bottom gate lines 101 and 102 are asymmetrical with respect to the GND level (0 V), and reverse bias voltage waveforms are set so that a change in the threshold voltage of a transistor constituting a photosensor can be minimized, as in the fourth and fifth embodiments.

When executing the pre-reading operation in this embodiment, at first, reset pulse signals φT1, φT2, ... φTn shown in FIGS. 13A–13C are sequentially applied to the top gate lines 101 with regular delay periods $T_{DELAY}$, thereby sequentially starting reset periods $T_{reset}$ for respective rows and initializing the double-gate photosensors 10 at the respective rows. Each of the reset pulse signals φT1, φT2, ... φTn has a positive voltage (high level) VtgH and a negative voltage (low level) VtgL (≠−VtgH), which are asymmetrical with respect to the GND level (0 V).

The reset pulses φT1, φT2, ... φTn sequentially fall to thereby sequentially finish the reset periods $T_{reset}$ and start respective light accumulating periods TA1, TA2, ... TAn. As a result, charges (positive holes) corresponding to the amount of light entering the double-gate photosensors 10 of each row from their gate electrode side are accumulated in the channel regions of the photosensors. After a pre-charge signal φpg shown in FIG. 13G is applied so that the light accumulating period TA1, TA2, ... TAn set for each row will vary in a stepwise manner in units of the predetermined delay period $T_{DELAY}$ after the last reset pulse φTn falls. Further, readout pulse signals φB1, φB2, ... φBn as shown in FIGS. 13D–13F are sequentially applied to the bottom gate lines 102, thereby sequentially starting readout periods $T_{read}$, sequentially reading a voltage change VD shown in FIG. 13H, which corresponds to charge accumulated in each double-gate photosensor 10, from the output circuit section 113 via a corresponding data line 103, and sequentially storing the read voltage change in the RAM 130.

The readout pulse signals φB1, φB2, ... φBn each have a positive voltage (high level) VbgH and a negative voltage (low level) VbgL (≠−VbgH) that are asymmetrical with respect to the GND level (0 V).

Since, in the above-described pre-reading operation, the light accumulating period TA1, TA2, ... TAn set for each row varies in units of as twice a period as the predetermined delay period $T_{DELAY}$, image data can be obtained which is read at a reading sensitivity set with a sensitivity adjusting width greater than the number of rows of the photosensor array 100. On the basis of this image data, the controller 120 extracts, for example, a light accumulating period that enables a maximum contrast of light and shade, and determines an optimal light accumulating period Ta. The method for determining the optimal light accumulating period Ta from image data is not limited to the above method for extracting conditions that enable the maximum contrast.

After the pre-reading operation, an image reading operation is executed using the optimal light accumulating period Ta determined by the pre-reading operation. This image reading operation is basically the same as that executed in the first to fifth embodiments.

Specifically, at first, reset pulse signals φT1, φT2, ... φTn are sequentially applied to the top gate lines 101, thereby sequentially starting reset periods $T_{reset}$ for respective rows and initializing the double-gate photosensors 10 at respective rows. These reset pulse signals φT1, φT2, ... φTn each have, like the reset pulse signals used in the pre-reading operation, a positive voltage (high level) VtgH and a negative voltage (low level) VtgL (≠−VtgH) that are asymmetrical with respect to the GND level (0 V).

The reset pulses φT1, φT2, ... φTn sequentially fall to sequentially finish the reset periods $T_{reset}$ and start the aforementioned optimal light accumulating periods Ta for respective rows, whereby charges (positive holes) are generated and accumulated in the channel region of each double-gate photosensor 10 in accordance with the amount of light entering it from its top gate electrode side.

After that, readout pulse signals φB1, φB2, ... φBn are sequentially applied to those double-gate photosensors 10 via the bottom gate lines 102 of respective rows, at which the optimal light accumulating period Ta and the pre-charge period $T_{prch}$ have elapsed, thereby sequentially starting readout periods $T_{read}$, sequentially reading a voltage change VD, which corresponds to charge accumulated in each double-gate photosensor 10, from the output circuit section 113 via a corresponding data line 103, and sequentially storing the read voltage change in the RAM 130.

These readout pulse signals φB1, φB2, ... φBn each have, like the readout pulse signals used in the pre-reading operation, a positive voltage (high level) VbgH and a negative voltage (low level) VbgL (≠−VbgH) that are asymmetrical with respect to the GND level (0 V).

After the image reading operation is executed for all rows, an effective voltage adjusting operation is executed during the effective voltage adjusting period for adjusting and optimizing the biased effective voltage signal applied to each gate line during the pre-reading operation and the image reading operation.

Specifically, during the effective voltage adjusting period, those correction signals are generated and applied to the top and bottom gate lines 101 and 102 of each row, which have effective voltages that can adjust the average values of the effective voltages applied thereto as reset pulse signals during the pre-reading period and the image reading period, and the effective voltages applied thereto during the effective voltage adjusting period, to optimal voltages Vte and Vbe that minimize, or make 0, a change in the threshold value of each transistor of each photosensor.

The signals applied to each top gate terminal TG and each bottom gate terminal BG during the effective voltage adjusting period will be described in more detail with reference to related figures. For facilitate the description, suppose that both the effective voltage applied to each top gate terminal TG and the effective voltage applied to each bottom gate terminal BG are biased to the low-level side, and the description is related only to the top and bottom gate lines of the first row.

Figure 14A:
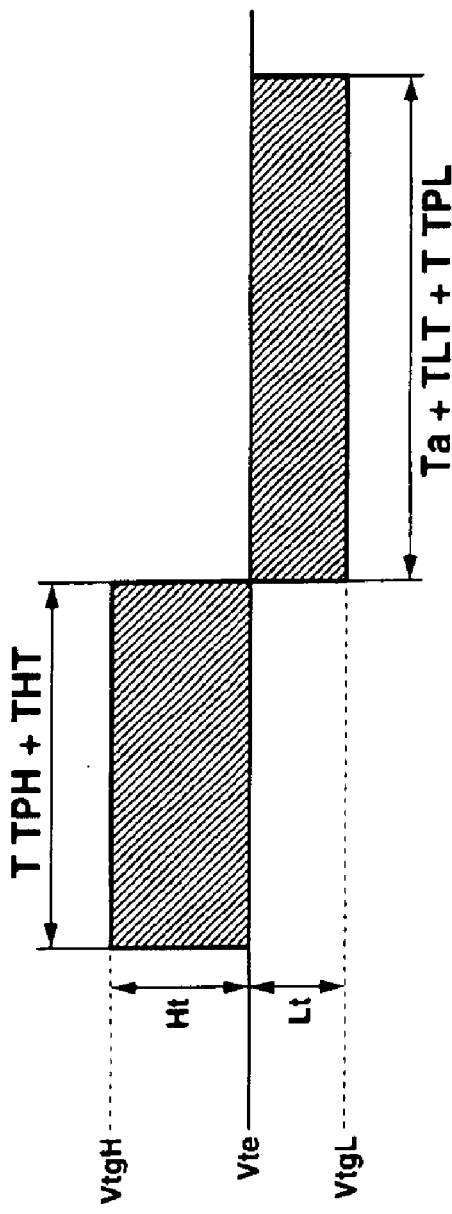
FIGS. 14A and 14B are conceptual diagrams showing the relationship between a signal applied to the photosensor of the sixth embodiment during an effective voltage adjusting operation period, and a signal applied to it during a pre-reading operation period and an image reading operation period.
Figure 14B:
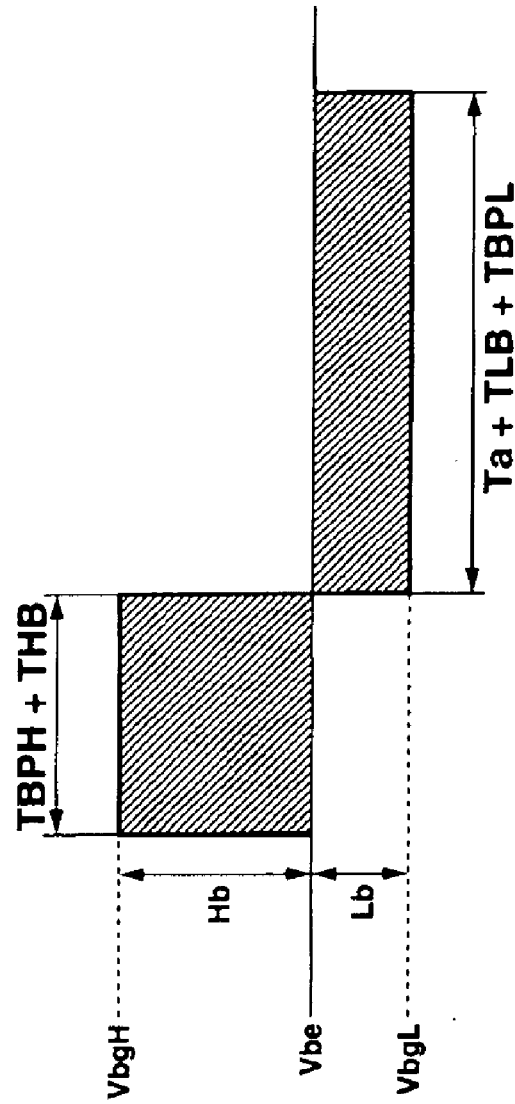

FIGS. 14A and 14B show the relationship, employed in the method for controlling the photosensor system according to this embodiment, between signals applied to each top gate terminal TG and each bottom gate terminal during the effective voltage adjusting period, and signals applied thereto during the pre-reading period and the image reading period.

As is shown in FIGS. 13A–13H, in the reset operation during the pre-reading period and the image reading period, a reset pulse signal φT1 of a high level voltage (positive voltage) VtgH is applied for only a very short period (for the reset period $T_{reset}$) to each top gate terminal TG via a corresponding top gate line 101. During a relatively long period other than the reset period, a low level voltage (negative voltage) VtgL is applied thereto. The light accumulating period Ta employed in the image reading operation is set during the pre-reading period in accordance with, for example, the illuminance of the environment.

On the other hand, also in the readout operation during the pre-reading period and the image reading period, a readout pulse signal φB1 of a high level voltage (positive voltage) VbgH is applied for only a very short period (for the readout period $T_{read}$) to each bottom gate terminal BG via a corresponding bottom gate line 102. During a relatively long period other than the readout period, a low level voltage (negative voltage) VbgL is applied thereto. The light accumulating period Ta employed in the image reading operation is set during the pre-reading period in accordance with, for example, the illumination of the environment.

In this embodiment, signals are generated, which have voltage waveforms that can make the absolute value of the high-level-side time integral value of the waveforms of voltages applied to each gate terminal of each photosensor during the pre-reading period, the image reading period and the period of the effective voltage adjusting operation to be executed, equal to the absolute value of the low-level-side time integral value of them, with reference to the optimal effective voltage Vte applied to each top gate terminal TG and the optimal effective voltage Vbe applied to each bottom gate terminal BG, which are set in accordance with the sensitivity characteristic of the double-gate photosensor. These generated signals are applied to each top gate line 101 and each bottom gate line 102 for the double-gate photosensors at predetermined time points during the effective voltage adjusting period.

As is shown in FIGS. 13A–13C, the correction signal applied to each top gate line 101 during the effective voltage adjusting period includes a low-level-side voltage component having a predetermined signal width (indicating a period in time) $T_{TPL}$, and a high-level-side voltage component having a predetermined signal width $T_{TPH}$, with respect to the optimal effective voltage Vte for each top gate terminal TG.

On the other hand, the correction signal applied to each bottom gate line 102 during the effective voltage adjusting period includes a low-level-side voltage component having predetermined signal widths $T_{BPLA}$ and $T_{BPLB}$, and a high-level-side voltage component having a predetermined signal width $T_{BPH}$, with respect to the optimal effective voltage Vbe for each bottom gate terminal BG.

The relationship between the correction signal applied to each top gate terminal TG and the other signal is shown in FIG. 14A. Suppose that, in FIG. 14A, Vte represents the optimal effective voltage of each top gate terminal TG, VtgH a high voltage contained in a signal applied thereto during the pre-reading period and the image reading period, VtgL a low voltage contained in the signal, Ta the optimal light accumulating period employed during the image reading operation, $T_{LT}$ a low level period other than the optimal light accumulating period during the pre-reading period and the image reading period, and $T_{HT}$ a high level period (i.e. $T_{RESET}+T_{RESET}$) during the pre-reading period and the image reading period. Then, the following equation is given:

$$Ht \cdot (T_{TPH}+T_{HT})=Lt \cdot (Ta+T_{LT}+T_{TPL}) \quad (1)$$

where Ht represents the absolute value (|VtgH−Vte|) of the difference between the high voltage VtgH and the optimal voltage Vte, and Lt the absolute value (|VtgL−Vte|) of the difference between the low voltage VtgL and the optimal voltage Vte.

From the equation (1), the relationship between the application period of the correction signal for each top gate line 101 during the effective voltage adjusting period, i.e. the relationship between the signal width $T_{TPH}$ of the high-level-side voltage component and the signal width $T_{TPL}$ of the low-level-side voltage component is given by $$T_{TPH}=Lt/Ht \cdot (Ta+T_{LT}+T_{TPL})-T_{HT} \quad (2)$$

Accordingly, even when the optimal light accumulating period during the image reading operation is changed in accordance with the illumination of the environment, if a signal of the high voltage VtgH is applied to each top gate line 101 for a period corresponding to $T_{TPH}$ expressed by the equation (2), the biased effective voltage applied to each top gate terminal TG can be adjusted to the optimal value Vte, thereby minimizing a change in the sensitivity characteristic of each double-gate photosensor due to degradation of its element characteristics.

On the other hand, the relationship between the correction signal applied to each bottom gate line 102 and the other signal is shown in FIG. 14B. Suppose that, in FIG. 14B, Vbe represents the optimal effective voltage of each bottom gate terminal BG, VbgH a high voltage contained in a signal applied thereto during the pre-reading period and the image reading period, VbgL a low voltage contained in the signal, Ta the optimal light accumulating period employed during the image reading operation, $T_{LB}$ a low level period other than the optimal light accumulating period Ta during pre-reading period and the image reading period, and $T_{HB}$ a high level period (i.e. $T_{READ}+T_{READ}$) during the pre-reading period and the image reading period. Then, the following equation is given:

$$Hb \cdot (T_{BPH}+T_{HB}) = Lb \cdot (Ta+T_{LB}+T_{BPL}) \quad (3)$$

where Hb represents the absolute value (|VbgH−Vbe|) of the difference between the high voltage VbgH and the optimal voltage Vbe, and Lb the absolute value (|VbgL−Vbe|) of the difference between the low voltage VbgL and the optimal voltage Vbe. Further, $T_{BPL}$ represents the total signal width ($T_{BPLA}+T_{BPLB}$) of the low-level-side voltage components.

From the equation (3), the relationship between the application period of the correction signal for each bottom gate line 102, i.e. the relationship between the signal width $T_{BPH}$ of the high-level-side voltage component and the signal width $T_{BPL}$ of the low-level-side voltage components is given by $$T_{BPH}=Lb/Hb \cdot (Ta+T_{LB}+T_{BPL})-T_{HB} \quad (4)$$

Accordingly, even when the optimal light accumulating period Ta during the image reading operation is changed in accordance with the illumination of the environment, if a signal of the high voltage VtgH is applied to each bottom gate line 102 for a period corresponding to $T_{BPH}$ expressed by the equation (2), the biased effective voltage applied to each bottom gate terminal BG can be adjusted to the optimal value Vte, thereby minimizing a change in the sensitivity characteristic of each double-gate photosensor due to degradation of its element characteristics.

The optimal effective voltages Vte and Vbe, set for each top gate terminal TG and each bottom gate terminal BG, respectively, during the above-described effective voltage adjusting operation in accordance with the sensitivity characteristic of the double-gate photosensors, are determined from the element structure of the double-gate photosensors or materials used for them, and can be positive voltages, negative voltages or 0 V.

Moreover, in this embodiment, the high-level-side voltage component and the low-level-side voltage component of the correction signal applied to each top or bottom gate terminal TG or BG during the effective voltage adjusting operation are identical to corresponding voltage components of the voltage signal applied thereto during the pre-reading operation and the image reading operation. In this case, two voltages are applied to each of the top and bottom gate terminals TG and BG, and hence each of the top gate driver 111 and the bottom gate driver 112 can be formed of a driver of a two-value output, as in the first, third and fifth embodiments. Since this type of driver is cheap, the photosensor system using such drivers can be made at a low cost.

However, the sixth embodiment is not limited to this structure. It may be modified like the second and fourth embodiments such that a signal applied to each top or bottom gate terminal TG or BG during the image reading period and the effective voltage adjusting period has different high level voltages and low level voltages, and hence each of the top and bottom gate drivers 111 and 112 can be formed of a driver of a multi-level output.

Further, in the sixth embodiment, the manner of executing the pre-reading operation is not limited to that shown in FIGS. 13A–13H, but may be modified.

FIGS. 15A–15H are timing charts illustrating another pre-reading operation that can be employed in the sixth embodiment.

In this pre-reading operation, at first, reset pulse signals φT1, φT2, . . . φTn as shown in FIGS. 15A–15C are simultaneously applied to all top gate lines 101, thereby starting a reset period $T_{reset}$ for all rows and simultaneously initializing the double-gate photosensors 10 of all rows.

The reset pulses φT1, φT2, . . . φTn simultaneously fall to finish the reset period $T_{reset}$ and simultaneously start light accumulating periods TB1, TB2, . . . TBn for the double-gate photosensors 10 of all rows, whereby charge (positive holes) is generated and accumulated in each channel region in accordance with the amount of light entering the double-gate photosensors 10 of each row from their top gate electrode side.

A pre-charge signal φpg as shown in FIG. 15G is applied so as to make the light accumulating periods TB1, TB2, . . . TBn, set for respective rows, longer by respectively increasing delay periods $T_{DELAY}$, and readout pulse signals φB1, φB2, . . . φBn are sequentially applied to the bottom gate lines 102 as shown in FIGS. 15D–15F, thereby sequentially starting readout periods $T_{read}$, sequentially reading voltage changes VD1, VD2, VD3, . . . VDm, which correspond to charge accumulated in the double-gate photosensors 10 of respective rows, from the output circuit section 113 via the respective data lines 103, and sequentially storing the read voltage change in the RAM 130.

Accordingly, image data read with different reading sensitivities set for the respective rows of an image of a subject can be obtained by reading the subject image only one time.

The manner of executing the pre-reading operation used in this embodiment is not limited to the above-described one. It is sufficient if an image of a subject can be read with different reading sensitivities. For example, a series of operations—a reset operation→a light accumulating operation→a pre-charge operation→a reading operation—may be repeated several times while sequentially changing the reading sensitivity to obtain image data using different reading sensitivities. Any other appropriate method may be, of course, employed.

Although, in the above-described embodiments, the double-gate photosensor is used as a photosensor, the invention is not limited to this. The control method of the invention is applicable to a photosensor system using another type of photosensors, if their sensitivity characteristic or element characteristics are liable to change or degrade because the voltage polarity of a signal applied during a pre-reading operation or an image reading operation, and such a change or degradation can be minimized by a correction signal applied during an effective voltage adjusting operation.

Although in the above-described embodiments, a pulse signal having an opposite voltage polarity is applied during the effective voltage adjusting operation in accordance with the operation characteristics of a double-gate photosensor or the structure of the photosensor system, the invention is not limited to this. If the average effective voltage during the entire period including the pre-reading period and the image reading period can be set at a value (0 V or a predetermined value) at which a change in the photosensor characteristics can be suppressed, a signal having a predetermined voltage may be applied instead of a pulse signal having an opposite voltage polarity.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photosensor system comprising:
   a photosensor array including a plurality of photosensors arranged two-dimensionally;
   initializing means for applying a reset pulse signal to each of the photosensors of the photosensor array, thereby initializing the photosensors;
   signal readout means for applying a pre-charge pulse signal to each of the photosensors of the photosensor array, applying a readout pulse signal to each of the photosensors, and receiving a voltage output from each of the photosensors; and
   effective voltage adjusting means for applying, to each of the photosensors, correction signals for correcting, to optimal values, effective voltages of the signals applied to each of the photosensors by the initializing means and the signal readout means,
   wherein the correction signals applied by the effective voltage adjusting means set, at 0 V, average effective voltages of the signals applied to the photosensors by the initializing means and the signal readout means.

2. The photosensor system according to claim 1, further comprising optimal reading sensitivity setting means for reading, using the signal readout means, a subject image formed of pixels corresponding to the photosensors arranged two-dimensionally while changing an image reading sensitivity set for each of the photosensors by the initializing means and the signal readout means, thereby determining an optimal image reading sensitivity on the basis of image patterns of the subject image formed with respective set reading sensitivities.

3. The photosensor system according to claim 1, wherein the correction signals applied by the effective voltage adjusting means adjust average effective voltages of signals, applied to each of the photosensors by the initializing means and the signal readout means, to values at which a change in a threshold voltage of each of the photosensors is minimized.

4. The photosensor system according to claim 1, wherein each of signals, applied to each of the photosensors by the initializing means and the effective voltage adjusting means and by the signal readout means and the effective voltage adjusting means, has a pair of high-level and low-level voltages.

5. The photosensor system according to claim 1, wherein each of signals, applied to each of the photosensors by the initializing means and the effective voltage adjusting means and by the signal readout means and the effective voltage adjusting means, has pairs of high-level and low-level voltages.

6. The photosensor system according to claim 1, wherein:
   each of the photosensors has a double-gate structure including a source electrode and a drain electrode formed with a semiconductor layer as a channel region interposed therebetween, and a top gate electrode and a bottom gate electrode formed above and below the channel region with respective insulating films interposed therebetween; and
   the initializing means initializes each of the photosensors by applying the reset pulse signal to the top gate electrode of each of the photosensors, and the signal readout means applies the readout pulse signal to the bottom gate electrode of each of the photosensors, thereby outputting, as the output voltage, a voltage corresponding to charge accumulated in the channel region during a charge accumulating period ranging from termination of the initialization to application of the readout pulse signal.

7. A photosensor system comprising:
   a photosensor array including a plurality of photosensors arranged two-dimensionally;
   initializing means for applying a reset pulse signal to each of the photosensors of the photosensor array, thereby initializing the photosensors;
   signal readout means for applying a pre-charge pulse signal to each of the photosensors of the photosensor array, applying a readout pulse signal to each of the photosensors, and receiving a voltage output from each of the photosensors; and
   effective voltage adjusting means for applying, to each of the photosensors, correction signals for correcting, to optimal values, effective voltages of the signals applied to each of the photosensors by the initializing means and the signal readout means,
   wherein voltage waveforms of the correction signals applied by the effective voltage adjusting means have time integral values of polarities opposite to those of time integral values of voltage waveforms of the signals applied to each of the photosensors by the initializing means and the signal readout means.

8. The photosensor system according to claim 7, further comprising optimal reading sensitivity setting means for reading, using the signal readout means, a subject image formed of pixels corresponding to the photosensors arranged two-dimensionally while changing an image reading sensitivity set for each of the photosensors by the initializing means and the signal readout means, thereby determining an optimal image reading sensitivity on the basis of image patterns of the subject image formed with respective set reading sensitivities.

9. The photosensor system according to claim 7, wherein the correction signals applied by the effective voltage adjusting means set, at 0 V, average effective voltages of the signals applied to the photosensors by the initializing means and the signal readout means.

10. The photosensor system according to claim 7, wherein the correction signals applied by the effective voltage adjusting means adjust average effective voltages of signals, applied to each of the photosensors by the initializing means and the signal readout means, to values at which a change in a threshold voltage of each of the photosensors is minimized.

11. The photosensor system according to claim 7, wherein each of signals, applied to each of the photosensors by the initializing means and the effective voltage adjusting means and by the signal readout means and the effective voltage adjusting means, has a pair of high-level and low-level voltages.

12. The photosensor system according to claim 7, wherein each of signals, applied to each of the photosensors by the initializing means and the effective voltage adjusting means and by the signal readout means and the effective voltage adjusting means, has pairs of high-level and low-level voltages.

13. The photosensor system according to claim 7, wherein:
- each of the photosensors has a double-gate structure including a source electrode and a drain electrode formed with a semiconductor layer as a channel region interposed therebetween, and a top gate electrode and a bottom gate electrode formed above and below the channel region with respective insulating films interposed therebetween; and
- the initializing means initializes each of the photosensors by applying the reset pulse signal to the top gate electrode of each of the photosensors, and the signal readout means applies the readout pulse signal to the bottom gate electrode of each of the photosensors, thereby outputting, as the output voltage, a voltage corresponding to charge accumulated in the channel region during a charge accumulating period ranging from termination of the initialization to application of the readout pulse signal.

14. A method of controlling a photosensor system including a photosensor array having a plurality of photosensors arranged two-dimensionally, comprising:
- an initializing step of applying a reset pulse signal to each of the photosensors of the photosensor array, thereby initializing the photosensors;
- a signal readout step of applying a pre-charge pulse signal to each of the photosensors of the photosensor array, applying a readout pulse signal to each of the photosensors, and receiving a voltage output from each of the photosensors; and
- an effective voltage adjusting step of adjusting, to predetermined optimal values, effective voltages of the signals applied to each of the photosensors in the initializing and signal readout steps,
- wherein voltage waveforms applied during the effective voltage adjusting step have time integral values of polarities opposite to those of time integral values of voltage waveforms of the signals applied to each of the photosensors during the initializing step and the signal readout step.

15. The method according to claim 14, wherein:
- each of the photosensors has a double-gate structure including a source electrode and a drain electrode formed with a semiconductor layer as a channel region interposed therebetween, and a top gate electrode and a bottom gate electrode formed above and below the channel region with respective insulating films interposed therebetween; and
- the initializing means initializes each of the photosensors by applying the reset pulse signal to the top gate electrode of each of the photosensors, and the signal readout means applies the readout pulse signal to the bottom gate electrode of each of the photosensors, thereby outputting, as the output voltage, a voltage corresponding to charge accumulated in the channel region during a charge accumulating period ranging from termination of the initialization to application of the readout pulse signal.

16. A method of controlling a photosensor system including a photosensor array having a plurality of photosensors arranged two-dimensionally, comprising:
- an initializing step of applying a reset pulse signal to each of the photosensors of the photosensor array, thereby initializing the photosensors;
- a signal readout step of applying a pre-charge pulse signal to each of the photosensors of the photosensor array, applying a readout pulse signal to each of the photosensors, and receiving a voltage output from each of the photosensors; and
- an effective voltage adjusting step of adjusting, to predetermined optimal values, effective voltages of the signals applied to each of the photosensors in the initializing and signal readout steps,
- wherein the optimal values of the effective voltages of the signals applied to the photosensors, adjusted in the effective voltage adjusting step, are 0 V.

17. The method according to claim 16, wherein:
- each of the photosensors has a double-gate structure including a source electrode and a drain electrode formed with a semiconductor layer as a channel region interposed therebetween, and a top gate electrode and a bottom gate electrode formed above and below the channel region with respective insulating films interposed therebetween; and
- the initializing means initializes each of the photosensors by applying the reset pulse signal to the top gate electrode of each of the photosensors, and the signal readout means applies the readout pulse signal to the bottom gate electrode of each of the photosensors, thereby outputting, as the output voltage, a voltage corresponding to charge accumulated in the channel region during a charge accumulating period ranging from termination of the initialization to application of the readout pulse signal.

18. The method according to claim 16, further comprising:
- a pre-reading step of reading a subject image formed of pixels corresponding to the photosensors of the photosensor array arranged two-dimensionally, while changing an image reading sensitivity set for each of the photosensors in the initializing step and the signal readout step, thereby setting an optimal image reading sensitivity on the basis of image patterns of the subject image obtained while changing the image reading sensitivity;
- an image reading step of reading an entire portion of the subject image using the set optimal image reading sensitivity; and
- an effective voltage adjusting step of adjusting, to the optimal values, the effective voltages of the signals applied to each of the photosensors of the photosensor array during the pre-reading step and the image reading step.

19. The method according to claim 18, wherein the pre-reading step includes:
- a first step of applying a first reset pulse signal, having a predetermined polarity, to each of the photosensors in a first time period, thereby initializing the photosensors, a first signal voltage being applied during a period other than the first time period; and
- a second step of applying, after the initialization, a first readout pulse signal, having a predetermined polarity, to each of the photosensors in a second time period, at which a pre-charge operation based on the pre-charge pulse signal has been finished, thereby outputting a first readout voltage corresponding to charge accumulated during a charge accumulating period ranging from termination of the initialization to application of the first readout pulse signal, a second signal voltage being applied during a period other than the second time period; and the first readout pulse signal is applied in the second time period such that it changes the charge accumulating period at a predetermined ratio, and an optimal charge accumulating period is determined on the basis of an image pattern of the subject image obtained from the first readout voltage corresponding to charge accumulated in each charge accumulating period.

20. The method according to claim 19, wherein the image reading step includes:

a third step of applying a second reset pulse signal, having a predetermined polarity, to each of the photosensors in a third time period, thereby initializing the photosensors, a third signal voltage being applied during a period other than the third time period; and a fourth step of applying, after the initialization, a second readout pulse signal, having a predetermined polarity, to each of the photosensors at which a pre-charge operation based on the pre-charge pulse signal has been finished, in a fourth time period corresponding to the optimal charge accumulating period determined during the pre-reading step, thereby outputting a second readout voltage corresponding to charge accumulated during the optimal charge accumulating period ranging from termination of the initialization to application of the second readout pulse signal, a fourth signal voltage, being applied during a period other than the fourth time period; and the effective voltage adjusting step includes;

a fifth step of applying, to each of the photosensors, a fifth signal having a predetermined effective voltage for adjusting, to the optimal value, an effective voltage applied to each of the photosensors and based on the first and second reset pulse signals and the first and third signal voltages applied in the first and third steps; and a sixth step of applying, to each of the photosensors, a sixth signal having a predetermined effective voltage for adjusting, to the optimal value, an effective voltage applied to each of the photosensors and based on the first and second readout pulse signals and the second and fourth signal voltages applied in the second and fourth steps.

21. The method according to claim 20, wherein:

the fifth signal is created with reference to the optimal effective voltage set in accordance with a sensitivity characteristic of each of the photosensors and has an effective voltage with a polarity opposite to the effective voltage applied to each of the photosensors and based on the first and second reset pulse signals and the first and third signal voltages applied in the first and third steps; and the sixth signal is created with reference to the optimal effective voltage set in accordance with the sensitivity characteristic of each of the photosensors and has an effective voltage with a polarity opposite to the effective voltage applied to each of the photosensors and based on the first and second readout pulse signals and the second and fourth signal voltages applied in the second and fourth steps.

22. The method according to claim 20, wherein:

in the fifth step, the fifth signal is applied to each of the photosensors, which has a fifth voltage component lower than the optimal effective voltage set in accordance with the sensitivity characteristic of each of the photosensors, and a sixth voltage component higher than the optimal effective voltage, the fifth and sixth voltage components having their time widths set to predetermined values at which an absolute value of a time integral value of the first and third signal voltages and the fifth voltage component is equal to an absolute value of a time integral value of the first and second reset pulse signals and the sixth voltage component; and in the sixth step, the sixth signal is applied to each of the photosensors, which has a seventh voltage component lower than the optimal effective voltage set in accordance with the sensitivity characteristic of each of the photosensors, and an eighth voltage component higher than the optimal effective voltage, the seventh and eighth voltage components having their time widths set to predetermined values at which an absolute value of a time integral value of the second and fourth signal voltages and the seventh voltage component is equal to an absolute value of a time integral value of the first and second readout pulse signals and the eighth voltage component.

23. The method according to claim 20, wherein voltage waveforms of the signals applied to each of the photosensors in the first, third and fifth steps, and voltage waveforms of the signals applied to each of the photosensors in the second, fourth and sixth steps are generated by two-value drivers each for generating a pair of low-level and high-level voltages.

24. The method according to claim 20, wherein voltage waveforms of the signals applied to each of the photosensors in the first, third and fifth steps, and voltage waveforms of the signals applied to each of the photosensors in the second, fourth and sixth steps are generated by multi-level drivers each for generating pairs of low-level and high-level voltages.

* * * * *